United States Patent
Chen et al.

(10) Patent No.: US 12,470,461 B2
(45) Date of Patent: Nov. 11, 2025

(54) METHOD AND APPARATUS FOR CONFIGURING NODE

(71) Applicant: Huawei Technologies Co., Ltd., Shenzhen (CN)

(72) Inventors: Rui Chen, Dongguan (CN); Tushou Xie, Beijing (CN); Yin Jia, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 18/338,546

(22) Filed: Jun. 21, 2023

(65) Prior Publication Data

US 2023/0336410 A1 Oct. 19, 2023

Related U.S. Application Data

(63) Continuation of application No. PCT/CN2021/118847, filed on Sep. 16, 2021.

(30) Foreign Application Priority Data

Dec. 22, 2020 (CN) .......................... 202011531306.1
Feb. 10, 2021 (CN) .......................... 202110185554.3

(51) Int. Cl.
*H04L 41/0869* (2022.01)
*H04L 41/084* (2022.01)

(52) U.S. Cl.
CPC ........ *H04L 41/0869* (2013.01); *H04L 41/084* (2013.01)

(58) Field of Classification Search
None
See application file for complete search history.

(56) References Cited

U.S. PATENT DOCUMENTS

| | | | | |
|---|---|---|---|---|
| 7,376,719 B1* | 5/2008 | Shafer | ................. | H04L 41/0873 709/223 |
| 8,024,440 B2* | 9/2011 | Jibbe | ................... | H04L 41/0873 709/223 |
| 8,250,184 B2* | 8/2012 | Poyhonen | ............... | H04L 63/12 709/221 |
| 8,291,506 B2* | 10/2012 | Shafer | ................... | G06F 21/604 709/224 |
| 8,504,660 B2* | 8/2013 | DeCusatis | ........... | H04L 41/0869 709/224 |

(Continued)

OTHER PUBLICATIONS

Enns R et al: "Network Configuration Protocol (NETCONF); rfc6241.txt", Network Configuration Protocol (NETCONF); rfc6241. txt, Internet Engineering Task Force, IETF; Standard, Internet Society (ISOC) 4, Rue Des Falaises CH-1205 Geneva, Switzerland, Jun. 30, 2011 (Jun. 30, 2011), pp. 1-113, XP015076061.

*Primary Examiner* — Backhean Tiv
(74) *Attorney, Agent, or Firm* — Slater Matsil, LLP

(57) ABSTRACT

In a method, after receiving a packet including first information, a server validates a configuration for a data node in a storage location identified by the first information. When the configuration for the data node fails to pass the validation, if the packet includes a first parameter, the server enables, based on the first parameter, a mode of outputting configuration information, and outputs recommended configuration information.

20 Claims, 8 Drawing Sheets

(56) References Cited

U.S. PATENT DOCUMENTS

| | | | | |
|---|---|---|---|---|
| 8,595,332 B2 * | 11/2013 | Ding | .................... | H04L 67/025 |
| | | | | 709/219 |
| 8,713,522 B2 * | 4/2014 | Blakeley | .................. | G06F 8/70 |
| | | | | 717/121 |
| 9,426,030 B1 * | 8/2016 | Anerousis | ........... | H04L 41/0886 |
| 9,529,772 B1 * | 12/2016 | Shankaran | .......... | H04L 67/1097 |
| 9,578,126 B1 * | 2/2017 | Kirti | .................. | H04L 12/4625 |
| 10,057,124 B2 * | 8/2018 | Affoneh | ............. | G06F 16/2457 |
| 10,397,051 B1 * | 8/2019 | Featonby | ............ | H04L 41/0806 |
| 10,749,759 B2 * | 8/2020 | Clark | ................. | G06F 16/2365 |
| 11,044,148 B2 * | 6/2021 | Patterson | ........... | H04L 41/0806 |
| 11,082,293 B2 * | 8/2021 | Clark | ..................... | H04L 41/14 |
| 11,088,913 B2 * | 8/2021 | Washenko | .............. | H04L 67/34 |
| 11,418,397 B1 * | 8/2022 | Engi | ....................... | G06N 20/00 |
| 11,513,982 B2 * | 11/2022 | Martin | .................... | G06N 5/01 |
| 11,528,191 B1 * | 12/2022 | Ficara | ................ | H04L 41/0627 |
| 11,586,611 B2 * | 2/2023 | Srinivasan | .......... | G06F 16/9024 |
| 11,765,154 B2 * | 9/2023 | Eichen | .................. | H04L 9/3263 |
| | | | | 713/168 |
| 11,915,014 B2 * | 2/2024 | Deka | .................... | H04L 41/0869 |
| 2005/0027858 A1 * | 2/2005 | Sloth | .................. | H04L 41/5009 |
| | | | | 709/224 |
| 2006/0015591 A1 * | 1/2006 | Datla | ....................... | G06F 8/33 |
| | | | | 709/220 |
| 2017/0054601 A1 * | 2/2017 | Affoneh | ............. | H04L 41/0883 |
| 2017/0171024 A1 * | 6/2017 | Anerousis | ........... | H04L 41/0803 |
| 2017/0195187 A1 * | 7/2017 | Bennett | ............... | H04L 41/0813 |
| 2017/0317884 A1 * | 11/2017 | Ackerman | ............... | G06F 15/00 |
| 2018/0034805 A1 * | 2/2018 | Eichen | ............... | H04L 63/0823 |
| 2019/0342296 A1 * | 11/2019 | Anandam | ............ | H04L 63/101 |
| 2020/0336374 A1 * | 10/2020 | Clark | ...................... | H04L 41/14 |
| 2021/0014283 A1 * | 1/2021 | Soroush | ................ | H04L 63/205 |
| 2023/0336410 A1 * | 10/2023 | Chen | .................. | H04L 41/0843 |
| 2024/0251041 A1 * | 7/2024 | Chai | ..................... | H04M 15/64 |

* cited by examiner

METHOD AND APPARATUS FOR CONFIGURING NODE

CROSS-REFERENCE TO RELATED APPLICATIONS

This application is a continuation of International Application No. PCT/CN2021/118847, filed on Sep. 16, 2021, which claims priority to Chinese Patent Application No. 202011531306.1, filed on Dec. 22, 2020, and claims priority to Chinese Patent Application No. 202110185554.3, filed on Feb. 10, 2021. All of the aforementioned applications are hereby incorporated by reference in their entireties.

TECHNICAL FIELD

This application relates to the field of network technologies, and in particular, to a method and an apparatus for configuring a node.

BACKGROUND

In the field of network technologies, a command-line interface (CLI) is used as a human-computer interaction tool. A user uses a series of command lines provided by the CLI to interact with a network device, and usability of the command-line interface directly determines user experience. Command lines include configuration commands for configuring a data node. The CLI needs to have at least functions of adding, deleting, querying, and modifying command lines with good experience, so that the user can perform a node configuration based on the CLI.

Currently, in a process of processing a node configuration, a network configuration protocol (Netconf) server generally needs to validate a configuration corresponding to a configuration command provided by the CLI. The Netconf server runs the configuration corresponding to the configuration command only after the validation succeeds.

A process of validating the node configuration may be: The Netconf server validates the configuration corresponding to the configuration command. If the configuration fails to pass the validation, the Netconf server sends a validation failure reason to the CLI, and the CLI displays the validation failure reason, so that the user attempts to construct a new configuration command in the CLI based on the validation failure reason and a user manual, and sends a new configuration corresponding to the new configuration command to the Netconf server, to expect that the new configuration can fix the problem.

In some complex node configuration processes, there are a large quantity of configurations to be validated. Once there are also a large quantity of configurations failing to pass validation, a user needs to reconstruct new configuration commands based on validation failure reasons of the configurations returned by the Netconf server. As a result, node configuration time is long, and node configuration efficiency is low.

SUMMARY

Embodiments of this application provide a method and an apparatus for configuring a node, to improve node configuration efficiency. The technical solutions are as follows:

According to a first aspect, a method for configuring a node is provided, applied to a server, where the method includes:

obtaining a first packet, where the first packet includes first information and a first parameter, the first information is for identifying a storage location of a configuration for a first data node, and the first parameter is for identifying a mode of outputting configuration information to be enabled when a first preset condition is satisfied; validating the configuration for the first data node based on the first information after the first packet is obtained; and outputting, based on the first parameter, the configuration information when a validation result satisfies the first preset condition.

In the method, after receiving the packet including the first information, the server validates the configuration for the data node in the storage location identified by the first information. When the configuration for the data node fails to pass the validation, if the packet includes the first parameter, the server enables, based on the first parameter, the mode of outputting configuration information, and outputs recommended configuration information. A user does not need to construct a new configuration command, to resolve a problem that the configuration for the data node fails to pass the validation, thereby reducing node configuration duration and improving node configuration efficiency.

In a possible implementation, the outputting the configuration information includes:

obtaining a first result based on a logical relationship between the first data node and a second data node included in a data structure to which the first data node belongs; and outputting the configuration information based on the first result, where the first result includes a reason why the configuration fails to pass the validation.

In a possible implementation, the configuration for the first data node includes deleting the first data node, and the logical relationship includes that the second data node references the first data node; and the obtaining a first result based on a logical relationship between the first data node and a second data node included in a data structure to which the first data node belongs includes:

if the second data node is created, obtaining, based on the logical relationship, a reason why the configuration fails to pass the validation, where the reason why the configuration fails to pass the validation includes that the second data node lacks the first data node to be referenced.

In a possible implementation, the configuration information includes deleting the second data node.

In a possible implementation, the configuration for the first data node includes creating the first data node, and the logical relationship includes that the first data node references the second data node; and the obtaining a first result based on a logical relationship between the first data node and a second data node included in a data structure to which the first data node belongs includes:

if the second data node is not created, obtaining, based on the logical relationship, a reason why the configuration fails to pass the validation, where the reason why the configuration fails to pass the validation includes that the first data node lacks the second data node to be referenced.

In a possible implementation, the configuration information includes creating the second data node.

In a possible implementation, the configuration for the first data node includes creating the first data node, and the logical relationship includes that the first data node and the second data node co-exist; and the obtaining a first result based on a logical relationship between the first data node and a second data node included in a data structure to which the first data node belongs includes:

if the second data node is not created, obtaining, based on the logical relationship, a reason why the configuration fails to pass the validation, where the reason why the configuration fails to pass the validation includes that the second data node is missing.

In a possible implementation, the configuration for the first data node includes configuring a parameter value of the first data node as a first configuration parameter value, and the logical relationship includes that the second data node is valid when the parameter value of the first data node satisfies a second preset condition; and the obtaining a first result based on a logical relationship between the first data node and a second data node included in a data structure to which the first data node belongs includes:

if the first configuration parameter value does not satisfy the second preset condition, obtaining, based on the logical relationship, a reason why the configuration fails to pass the validation, where the reason why the configuration fails to pass the validation includes that the parameter value of the first data node does not satisfy the second preset condition.

In a possible implementation, the configuration information includes: configuring the parameter value of the first data node to satisfy the second preset condition.

In a possible implementation, the configuration for the first data node includes configuring a parameter value of the first data node as a first configuration parameter value, and the logical relationship includes that the second data node is valid when a parameter value of at least one data node of a plurality of data nodes included in the data structure satisfies a third preset condition, where the plurality of data nodes include the first data node; and the obtaining a first result based on a logical relationship between the first data node and a second data node included in a data structure to which the first data node belongs includes:

when no data node that satisfies the third preset condition exists in the plurality of data nodes, if the first configuration parameter value does not satisfy the third preset condition, obtaining, based on the logical relationship, a reason why the configuration fails to pass the validation, where the reason why the configuration fails to pass the validation includes that a parameter value of at least one data node in the plurality of data nodes does not satisfy the third preset condition.

In a possible implementation, the configuration information includes:

creating a third data node of the plurality of data nodes that is not created, and configuring a parameter value of the third data node to satisfy the third preset condition; or configuring the parameter value of the first data node to satisfy the third preset condition.

In a possible implementation, the configuration for the first data node includes configuring a parameter value of the first data node as a first configuration parameter value, and the logical relationship includes that a parameter value of the second data node has a unique attribute; and the obtaining a first result based on a logical relationship between the first data node and a second data node included in a data structure to which the first data node belongs includes:

if the parameter value of the second data node is the first configuration parameter value, obtaining, based on the logical relationship, a reason why the configuration fails to pass the validation, where the reason why the configuration fails to pass the validation is that the parameter value of the second data node conflicts with the parameter value of the first data node.

In a possible implementation, the configuration information includes configuring the parameter value of the first data node as any parameter value other than the first configuration parameter value.

In a possible implementation, the configuration for the first data node includes creating a first quantity of first data nodes in the second data node, and the logical relationship includes that the quantity of the first data nodes in the second data node falls within a target range; and the obtaining a first result based on a logical relationship between the first data node and a second data node included in a data structure to which the first data node belongs includes:

if the first quantity does not fall within the target range, obtaining, based on the logical relationship, a reason why the configuration fails to pass the validation, where the reason why the configuration fails to pass the validation includes that the quantity of the first data nodes does not fall within the target range.

In a possible implementation, the configuration information includes: deleting a second quantity of first data nodes; or creating a third quantity of first data nodes in the second data node.

In a possible implementation, the first parameter includes a first sub-parameter, and the first sub-parameter is for identifying a first mode or a second mode of outputting configuration information to be enabled when the first preset condition is satisfied, where the first mode is that the output configuration information includes a first configuration in a configuration chain, the second mode is that the output configuration information includes the configuration chain, the configuration chain includes a configuration for at least one data node, and one data node corresponds to at least one configuration.

In a possible implementation, the first parameter includes a second sub-parameter, and the second sub-parameter is for identifying a third mode or a fourth mode of outputting configuration information to be enabled when the first preset condition is satisfied, where the third mode is outputting the configuration information, and the fourth mode is outputting the configuration information and the configuration for the first data node.

In a possible implementation, the first packet is a commit packet or a validate packet.

According to a second aspect, a method for configuring a node is provided, applied to a CLI, where the method includes:

generating a first packet, and outputting the first packet to a server, where the first packet includes first information and a first parameter, the first information is for identifying a storage location of a configuration for a first data node, and the first parameter is for identifying a mode of outputting configuration information to be enabled when a first preset condition is satisfied.

In a possible implementation, the first parameter includes a first sub-parameter, and the first sub-parameter is for identifying a first mode or a second mode of outputting configuration information to be enabled when the first preset condition is satisfied, where the first mode is that the output configuration information includes a first configuration in a configuration chain, the second mode is that the output configuration information includes the configuration chain, the configuration chain includes a configuration for at least one data node, and one data node corresponds to at least one configuration.

In a possible implementation, the first parameter includes a second sub-parameter, and the second sub-parameter is for identifying a third mode or a fourth mode of outputting configuration information to be enabled when the first preset condition is satisfied, where the third mode is outputting the configuration information, and the fourth mode is outputting the configuration information and the configuration for the first data node.

In a possible implementation, the first packet is a commit packet or a validate packet.

In a possible implementation, after the outputting the first packet to a server, the method further includes:
 receiving the configuration information, and displaying a configuration included in the configuration information.

According to a third aspect, an apparatus for configuring a node is provided, where the apparatus includes:
 an obtaining unit, configured to obtain a first packet, where the first packet includes first information and a first parameter, the first information is for identifying a storage location of a configuration for a first data node, and the first parameter is for identifying a mode of outputting configuration information to be enabled when a first preset condition is satisfied;
 a validation unit, configured to validate the configuration for the first data node based on the first information; and
 an output unit, configured to output, based on the first parameter, the configuration information when a validation result satisfies the first preset condition.

In a possible implementation, the output unit includes:
 an obtaining subunit, configured to obtain a first result based on a logical relationship between the first data node and a second data node included in a data structure to which the first data node belongs, where the first result includes a reason why the configuration fails to pass the validation; and
 an output subunit, configured to output the configuration information based on the first result.

In a possible implementation, the configuration for the first data node includes deleting the first data node, and the logical relationship includes that the second data node references the first data node; and
 the obtaining subunit is configured to: if the second data node is created, obtain, based on the logical relationship, a reason why the configuration fails to pass the validation, where the reason why the configuration fails to pass the validation includes that the second data node lacks the first data node to be referenced.

In a possible implementation, the configuration information includes deleting the second data node.

In a possible implementation, the configuration for the first data node includes creating the first data node, and the logical relationship includes that the first data node references the second data node; and the obtaining subunit is configured to: if the second data node is not created, obtain, based on the logical relationship, a reason why the configuration fails to pass the validation, where the reason why the configuration fails to pass the validation includes that the first data node lacks the second data node to be referenced.

In a possible implementation, the configuration information includes creating the second data node.

In a possible implementation, the configuration for the first data node includes creating the first data node, and the logical relationship includes that the first data node and the second data node co-exist; and
 the obtaining subunit is configured to: if the second data node is not created, obtain, based on the logical relationship, a reason why the configuration fails to pass the validation, where the reason why the configuration fails to pass the validation includes that the second data node is missing.

In a possible implementation, the configuration information includes creating the second data node.

In a possible implementation, the configuration for the first data node includes configuring a parameter value of the first data node as a first configuration parameter value, and the logical relationship includes that the second data node is valid when the parameter value of the first data node satisfies a second preset condition; and
 the obtaining subunit is configured to: if the first configuration parameter value does not satisfy the second preset condition, obtain, based on the logical relationship, a reason why the configuration fails to pass the validation, where the reason why the configuration fails to pass the validation includes that the parameter value of the first data node does not satisfy the second preset condition.

In a possible implementation, the configuration information includes: configuring the parameter value of the first data node to satisfy the second preset condition.

In a possible implementation, the configuration for the first data node includes configuring a parameter value of the first data node as a first configuration parameter value, and the logical relationship includes that the second data node is valid when a parameter value of at least one data node of a plurality of data nodes included in the data structure satisfies a third preset condition, where the plurality of data nodes include the first data node; and
 the obtaining subunit is configured to: when no data node that satisfies the third preset condition exists in the plurality of data nodes, if the first configuration parameter value does not satisfy the third preset condition, obtain, based on the logical relationship, a reason why the configuration fails to pass the validation, where the reason why the configuration fails to pass the validation includes that a parameter value of at least one data node in the plurality of data nodes does not satisfy the third preset condition.

In a possible implementation, the configuration information includes:
 creating a third data node of the plurality of data nodes that is not created, and configuring a parameter value of the third data node to satisfy the third preset condition; or
 configuring the parameter value of the first data node to satisfy the third preset condition.

In a possible implementation, the configuration for the first data node includes configuring a parameter value of the first data node as a first configuration parameter value, and the logical relationship includes that a parameter value of the second data node has a unique attribute; and the obtaining subunit is configured to: if the parameter value of the second data node is the first configuration parameter value, obtain, based on the logical relationship, a reason why the configuration fails to pass the validation, where the reason why the configuration fails to pass the validation is that the parameter value of the second data node conflicts with the parameter value of the first data node.

In a possible implementation, the configuration information includes configuring the parameter value of the first data node as any parameter value other than the first configuration parameter value.

In a possible implementation, the configuration for the first data node includes creating a first quantity of first data nodes in the second data node, and the logical relationship includes that the quantity of the first data nodes in the second data node falls within a target range; and the obtaining subunit is configured to: if the first quantity does not fall within the target range, obtain, based on the logical relationship, a reason why the configuration fails to pass the validation, where the reason why the configuration fails to pass the validation includes that the quantity of the first data nodes does not fall within the target range.

In a possible implementation, the configuration information includes:

deleting a second quantity of first data nodes; or creating a third quantity of first data nodes in the second data node.

In a possible implementation, the first parameter includes a first sub-parameter, and the first sub-parameter is for identifying a first mode or a second mode of outputting configuration information to be enabled when the first preset condition is satisfied, where the first mode is that the output configuration information includes a first configuration in a configuration chain, the second mode is that the output configuration information includes the configuration chain, the configuration chain includes a configuration for at least one data node, and one data node corresponds to at least one configuration.

In a possible implementation, the first parameter includes a second sub-parameter, and the second sub-parameter is for identifying a third mode or a fourth mode of outputting configuration information to be enabled when the first preset condition is satisfied, where the third mode is outputting the configuration information, and the fourth mode is outputting the configuration information and the configuration for the first data node.

In a possible implementation, the first packet is a commit packet or a validate packet.

According to a fourth aspect, an apparatus for configuring a node is provided, where the apparatus includes:

a generation unit, configured to generate a first packet, where the first packet includes first information and a first parameter, the first information is for identifying a storage location of a configuration for a first data node, and the first parameter is for identifying a mode of outputting configuration information to be enabled when a first preset condition is satisfied; and an output unit, configured to output the first packet to a server.

In a possible implementation, the first parameter includes a first sub-parameter, and the first sub-parameter is for identifying a first mode or a second mode of outputting configuration information to be enabled when the first preset condition is satisfied, where the first mode is that the output configuration information includes a first configuration in a configuration chain, the second mode is that the output configuration information includes the configuration chain, the configuration chain includes a configuration for at least one data node, and one data node corresponds to at least one configuration.

In a possible implementation, the first parameter includes a second sub-parameter, and the second sub-parameter is for identifying a third mode or a fourth mode of outputting configuration information to be enabled when the first preset condition is satisfied, where the third mode is outputting the configuration information, and the fourth mode is outputting the configuration information and the configuration for the first data node.

In a possible implementation, the first packet is a commit packet or a validate packet.

In a possible implementation, the apparatus further includes:

a receiving unit, configured to receive the configuration information; and a display unit, configured to display a configuration included in the configuration information.

According to a fifth aspect, a computer device is provided, where the computer device includes a processor and a memory, and the memory stores at least one piece of program code, and the program code is loaded and executed by the processor, to implement an operation performed in the method provided in the first aspect or any optional manner of the first aspect.

According to a sixth aspect, a computer device is provided, where the computer device includes a processor and a memory, and the memory stores at least one piece of program code, and the program code is loaded and executed by the processor to implement an operation performed in the method provided in the second aspect or any optional manner of the second aspect.

According to a seventh aspect, a computer-readable storage medium is provided, where the storage medium stores at least one piece of program code, and the program code is loaded and executed by a processor to implement an operation performed in any one of the foregoing methods.

According to an eighth aspect, a computer program product or a computer program is provided, where the computer program product or the computer program includes program code, the program code is stored in a computer-readable storage medium, a processor of a computer device reads the program code from the computer-readable storage medium, and the processor executes the program code, to enable the computer device to perform the method provided in the first aspect or each optional implementation of the first aspect, or enable the computer device to perform the method provided in the second aspect or each optional implementation of the second aspect.

DETAILED DESCRIPTION OF ILLUSTRATIVE EMBODIMENTS

Figure 1:
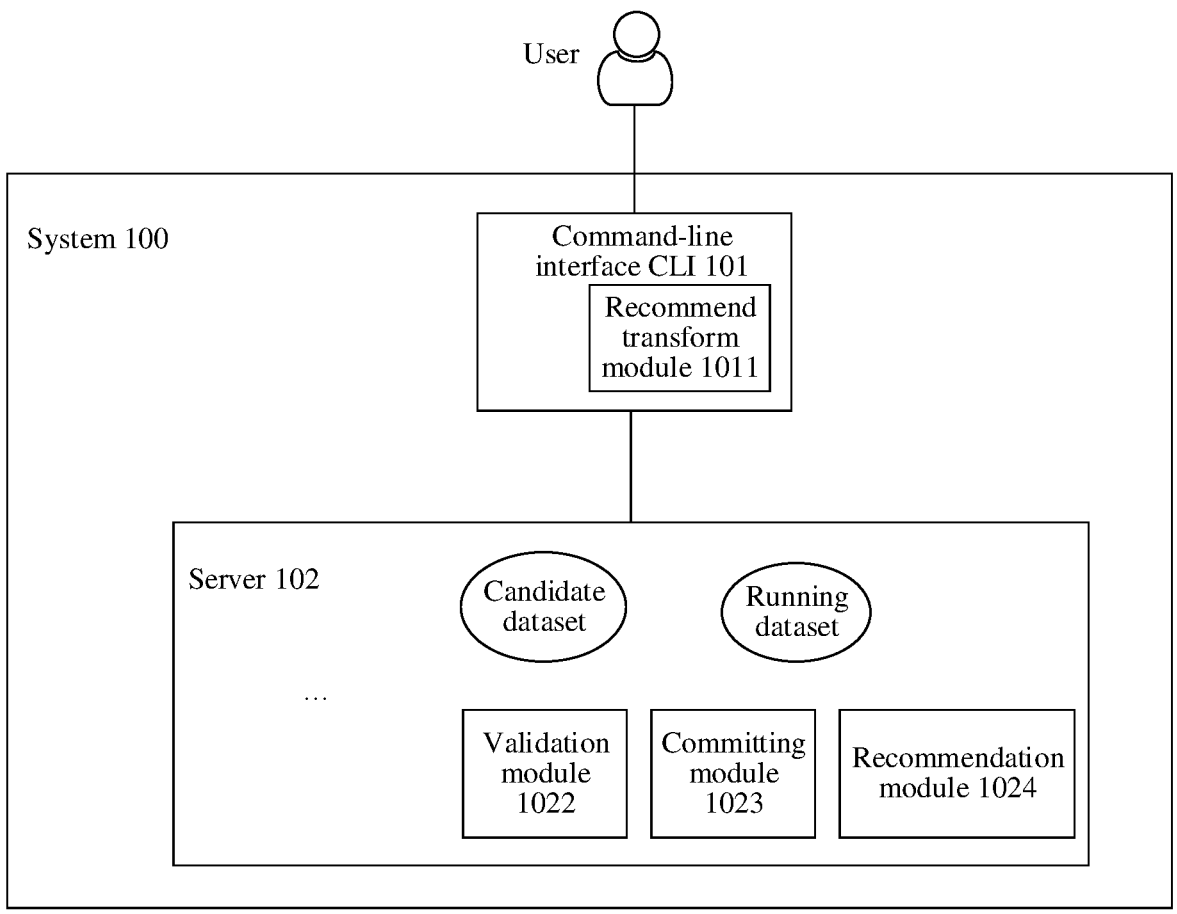
FIG. 1 is a schematic diagram of a system for configuring a node according to an embodiment of this application.

To make the objectives, technical solutions, and advantages of this application clearer, the following further describes the implementations of this application in detail with reference to the accompanying drawings.

To facilitate understanding of this application, terms in this application are first described as follows:

Data structure: It is an instantiation structure obtained after service data is modeled by using a data modeling language. The data modeling language is, for example, YANG. The service data is, for example, configuration data, status data, or a combination of configuration data and status data. The data structure is, for example, a data tree obtained after service data is modeled by using YANG.

Data node: The data node is instantiated in a data structure, and the data structure includes a plurality of data nodes, such as a container, a leaf node, a leaf list, a list, any data (anydata) node, and any extensible markup language (anyxml) node. The container is an internal data node in the data structure, and the container exists in at most one instance in the data structure. The container has no value, but a set of child nodes. The container is a data node that belongs to a model. For example, a data node ifm in ifm/interfaces/interface name is a container in an xx-ifm model, and a plurality of interfaces in the container are child nodes. The leaf node is a data node that exists in at most one instance in the data structure. The leaf node has a value but no child node. For example, a data node name in ifm/interfaces/interface name is a leaf node, and the data node name can have a specific value. The leaf list is similar to the leaf node, but defines a set of uniquely identifiable data nodes rather than a single data node. Each data node in the leaf list has a value, but no child node. The list is an internal data node that may exist in a plurality of instances of the data structure. The list has no data value, but a set of child nodes. The anydata node includes a plurality of unknown child nodes, and the plurality of unknown child nodes may be obtained by modeling by using YANG. The anyxml node is a data node that contains an unknown extensible markup language (XML) data block.

Server: It is an entity that provides a client with access to a data structure through a network management protocol. The server includes a candidate dataset and a running dataset, where the candidate dataset is for temporarily storing a configuration for each data node that is sent by a CLI, and a configuration for a data node may be understood as a configuration operation performed on the data node. The running dataset is for storing a configuration for a data node that passes validation, and the server constructs the data structure by executing the configuration in the running dataset.

CLI: It is an interface for interaction between a server and a user and is a client. The user gives various types of commands (such as an edit command, a commit command, and a validate command) in the CLI, where the CLI sends a command given by the user to the server, and the server processes a configuration for a data node after receiving the command. Different types of commands are for instructing the server to perform different types of processing on configurations for data nodes. For example, the edit command is for instructing to edit the configurations for the data nodes to the candidate dataset in the server, and the commit command is for instructing to validate the configurations for the data nodes in the candidate dataset, and commit a configuration that passes validation to the running dataset. A validate packet is for instructing to validate a configuration for a data node in a database. The database includes at least one of a candidate dataset, a running dataset, and another type of dataset. The CLI is any type of CLI, for example, model driven (MD)-CLI. The CLI interacts with the server to process the configuration for the data node. The processing process includes an edit process, a commit process, a query process, and the like of the configuration. Using the MD-CLI as an example, the user implements user operations of logging in to the MD-CLI→editing configurations→committing configurations→querying configurations→exiting the MD-CLI by editing command lines in the following pseudocode 1. One command line is a command that the user edits in the CLI, or is considered as a command given by the user.

Pseudocode 1:
```
<root@sys>
MDCLI> system-view #Enter the system view
[root@sys]
MDCLI> edit-config #Enter the edit mode
[(gl)root@sys]
MDCLI> ifm interfaces interface name eth0 #Edit the
    configuration
[*(gl)root@sys]/ifm/interfaces/interface[name="eth0"]
MDCLI> display this candidate #Query candidate data-
    sets
{
    "name": "eth0" #Query result
}
[*(gl)root@sys]/ifm/interfaces/interface[name="eth0"]
MDCLI> display this #Query the running dataset
[*(gl)root@sys]/ifm/interfaces/interface[name="eth0"]
MDCLI> commit #Commit the configuration
[(gl)root@sys]/ifm/interfaces/interface[name="eth0"]
MDCLI> display this #Query the running dataset again
{
    "name": "eth0" #Query result
}
[(gl)root@sys]/ifm/interfaces/interface[name="eth0"]
MDCLI> exit #Exit
```

The following description is made based on the pseudocode 1: A user edits, on the MD-CLI, a login command for instructing to enter the system view, and gives the login command to the MD-CLI by performing a confirmation operation on the login command. After detecting that the user performs the confirmation operation on the login command, the MD-CLI enters the system view. Then, the user edits, on the MD-CLI, a mode command for instructing to enter the edit mode. After the MD-CLI detects that the user performs a confirmation operation on the mode command line, the MD-CLI enters the edit mode. Then, in the edit mode, the user edits, on the MD-CLI, a configuration command for representing the configuration for the data node. For example, the configuration command is: ifm/interfaces/interface[name="eth0"]. The configuration represented by the configuration command is to configure the parameter value of the data node name in the model ifm as eth0. The user gives the edit command to the CLI by performing a confirmation operation on the configuration command. After detecting that the user performs the confirmation operation on the configuration command line, the MD-CLI sends the configuration indicated by the edit command to the server, and the server stores the configuration in the candidate dataset. Then, the user edits, on the MD-CLI, a first query command for querying the candidate dataset, and gives the first query command to the MD-CLI by performing a confirmation operation on the first query command. After detecting that the user performs the confirmation operation on the first query command, the MD-CLI sends the first query command to the server. After receiving the first query command, the server returns the configuration in the candidate dataset to the MD-CLI, and the MD-CLI displays the found configuration.

In addition to the configuration in the candidate dataset, the user can query the configuration in the running dataset. Using the pseudo code 1 as an example, the user edits, on the MD-CLI, a second query command for querying the running dataset, and gives the second query command to the MD-CLI by performing a confirmation operation on the second query command. After detecting that the user performs the confirmation operation on the second query command, the MD-CLI sends the second query command to the server. If the configuration in the candidate dataset is not committed to the running dataset, the running dataset is empty. The server feeds back, based on the second query command, that the running dataset is empty (that is, there is no query result) to the CLI.

Then, to be able to run the configuration in the candidate dataset, the user edits, on the MD-CLI, a commit command for committing the candidate dataset, and gives the commit command to the MD-CLI by performing a confirmation operation on the commit command. After detecting that the user performs the confirmation operation on the commit command, the MD-CLI sends the commit command to the server. After the server receives the commit command, the server validates each configuration in the candidate dataset, and commits a configuration passing the validation to the running dataset. Subsequently, when the user queries the configuration in the running dataset, the server returns the configuration in the running dataset to the MD-CLI, and the MD-CLI displays the configuration in the running dataset. The pseudocode 1 is used as an example. If the server has committed the configuration for the data node name in the candidate dataset to the running dataset, the MD-CLI can display "name": "eth0" when the user queries the running dataset.

It should be noted that the pseudocode 1 is described by using an example in which the user commits an edit task of a configuration to the server. In a possible implementation, after the MD-CLI enters the edit mode, the user edits a plurality of configuration commands on the MD-CLI, so that the CLI sends a configuration indicated by each configuration command to the server.

In a possible implementation, a format of the configuration command edited by the user in the CLI may be of a plurality of forms. A format of the configuration command is not limited in this embodiment of this application. For example, in the configuration command in the pseudocode 1, data nodes are configured in a manner in which all the data nodes are separated by spaces and go deep in sequence from left to right. Another manner is to use a touch command, which follows a touch path value to edit configurations for data nodes. For example, the following two equivalent commands are for indicating a same configuration for a same data node.

ifm interfaces interface name eth0
    <==>
touch/ifm/interfaces/interface/name eth0

In a possible implementation, the CLI and the server exchange information in a form of a Netconf packet. For example, the CLI gives a command to the server by sending a Netconf packet to the server. For any command received by the CLI, the CLI converts the any command into a Netconf packet of a corresponding type, and sends the packet obtained through the conversion to the server, so as to give the any command to the server. For example, the CLI converts a configuration command in the edit mode into an edit packet, converts a commit command into a commit packet, and converts a validate command into a validate packet.

Alternatively, the Netconf packet is a RPC packet. For example, after the user gives the aforementioned touch command, the CLI converts the command into the following edit packet and delivers the edit packet to the server:

```
<rpc xmlns="urn:ietf:params:xml:ns:netconf:base:1.0">
    #packet header
<edit-config> #Edit the configuration
<target> #Edit target
<candidate/> #Candidate dataset
</target>
<test-option>set</test-option>
<config> #Configuration
<ifm xmlns=\"urn:xx:yang:xx-ifm\">
<interfaces>
<interface>
<name>eth0</name>
</interface>
</interfaces>
</ifm>
</config>
</edit-config>
</rpc>
```

After storing the configuration indicated by the edit packet into the candidate dataset, the server returns the following edit success packet to the CLI, to notify the CLI that the editing is successful.

```
<rpc-reply message-id="101"
xmlns="urn:ietf:params:xml:ns:netconf:base:1.0">
<ok/>
</rpc-reply>
```

FIG. 1 is a schematic diagram of a system for configuring a node according to an embodiment of this application. Referring to FIG. 1, the system 100 includes a CLI 101 and a server 102. In a possible implementation, the CLI 101 includes a recommend transform module 1011. A display interface of the CLI 101 is configured to display various commands edited by a user and display information returned by the server 102.

In a possible implementation, the server 102 includes an editing module 1021, a validation module 1022, a committing module 1023, and a recommendation module 1024. The editing module 1021 is configured to process a task related to configuring and editing. An operation object of the editing module 1021 is generally a candidate dataset. For example, the editing module 1021 stores a configuration indicated by a configuration command into the candidate dataset. The validation module 1022 is configured to validate configurations for data nodes stored in a database. The committing module 1023 is configured to commit the configuration in the candidate dataset to a running dataset, so as to run a committed configuration operation. The recommendation module 1024 is configured to return recommended configuration information to the CLI 101 for a configuration that fails to pass the validation by the validation module 1022.

Figure 2:
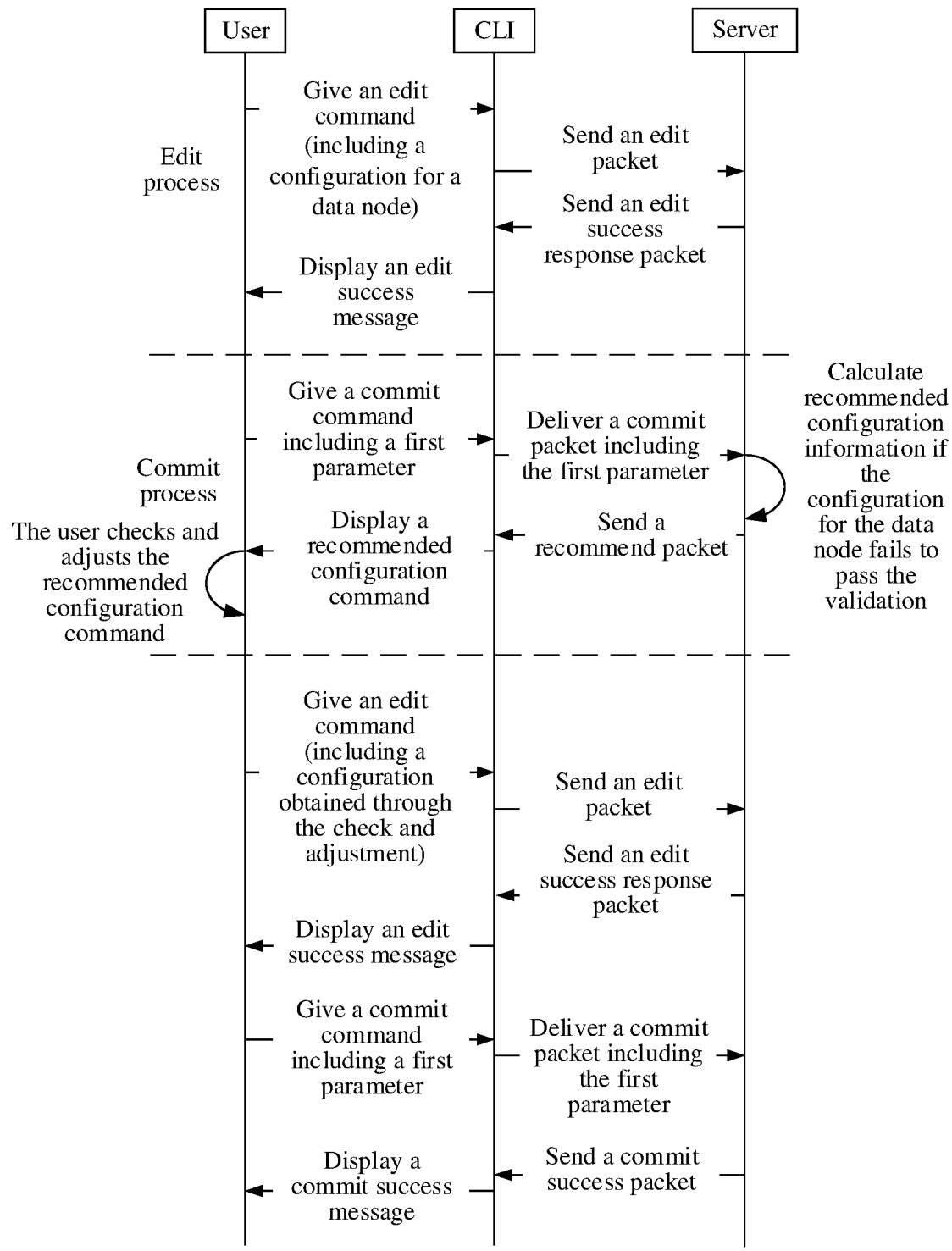
FIG. 2 is a flowchart of a method for configuring a node according to an embodiment of this application.

To further describe an interaction process between the modules in the CLI 101 and the server 102, a flowchart of a method for configuring a node according to an embodiment of this application shown in FIG. 2 is used as an example to describe the following:

A node configuration is short for a configuration for a data node. In an editing process of the node configuration, when the CLI 101 is in the edit mode, the user edits, in the display interface of the CLI 101, a configuration command for indicating the configuration for the data node, and gives an edit command to the CLI 101. The CLI 101 converts the configuration command into an edit packet, and sends the edit packet to the editing module 1021 in the server 102. After receiving the edit packet, the editing module 1021 performs initial validation on the configuration for the data node indicated by the edit packet. If the configuration for the data node passes the initial validation, the editing module 1021 stores the configuration for the data node in the candidate dataset, and returns an edit success packet to the CLI 101. After the CLI 101 receives the edit success packet, the CLI 101 displays an edit success message in the display interface, so as to notify the user that the configuration for the data node edited by the user is successfully edited. The initial validation is to validate whether a configuration for a data node provided by the CLI 101 complies with a basic predefined rule. For example, the configuration for the data node includes creating a data node. If the data node is a data node in a predefined data structure, the initial validation succeeds; otherwise, the initial validation fails. If a parameter value of the data node included in the configuration for the data node is less than a threshold of the data node, the initial validation succeeds; otherwise, the initial validation fails.

In a committing process of the node configuration, the user edits, in the display interface of the CLI 101, a commit command including a first parameter, to give the commit command to the CLI 101. The CLI 101 converts the commit command into a commit packet that includes the first parameter, and sends the commit packet to the committing module 1023 in the server 102. After the committing module 1023 receives the commit packet, the validation module 1022 is invoked to validate the configuration for the data node in the candidate dataset. If the configuration for the data node fails to pass the validation, the validation module 1022 sends, based on the first parameter included in the validation packet, the configuration for the data node to the recommendation module 1024, and the recommendation module 1024 calculates recommended configuration information based on the configuration for the data node, converts the configuration information into a recommend packet, and sends the recommend packet to the CLI. After the CLI 101 receives the recommend packet, the recommend transform module 1011 in the CLI 101 converts configuration information indicated by the recommend packet into a recommended configuration command, and displays the recommended configuration command in the display interface of the CLI 101, so as to be presented to the user. The user checks and adjusts the recommended configuration command. With reference to the foregoing editing process of the node configuration, the user stores the configuration indicated by the checked and adjusted configuration command in the candidate dataset in the server 102. The user sends a commit command including the first parameter to the CLI 101 again. The CLI 101 converts the received commit command into a commit packet including the first parameter, and sends the commit packet to the committing module 1023 in the server 102. Then, the committing module 1023 validates the configurations (including the configuration indicated by the checked and adjusted configuration command) of the data nodes in the candidate dataset. If there is still a configuration operation that fails to pass the validation, the server 102 returns a recommend packet to the CLI 101 again. The user again stores the checked and adjusted configuration command in the candidate dataset of the server 102 and again gives the commit command. If the configuration for the data node in the candidate dataset passes the validation, the server 102 returns a commit success packet to the CLI 101. After receiving the commit success packet, the CLI 101 displays a commit success message on the display interface, so as to notify the user that the configuration in the candidate dataset has been committed to the running dataset.

It should be noted that the system 100 may be deployed on one computer device, or may be deployed on a plurality of computer devices. When the system 100 is deployed on one computer device, the CLI 101 and the server 102 are each equivalent to one independent processing module. When the system 100 is deployed on a plurality of computer devices, a function of the CLI 101 may be implemented by one computer device, and a function of the server 102 may be implemented by one or more computer devices.

Figure 3:
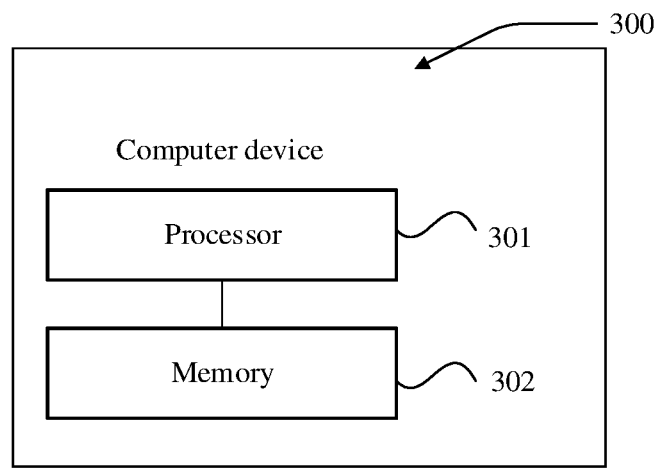
FIG. 3 is a schematic diagram of a structure of a computer device according to an embodiment of this application.

Refer to FIG. 3 that is a schematic diagram of a structure of a computer device according to an embodiment of this application. The computer device 300 may greatly differ due to different configurations or performance, and includes one or more processors 301 and one or more memories 302. The processor includes a central processing unit (CPU). The memory 302 stores at least one piece of program code, and the at least one piece of program code is loaded and executed by the processor 301 to implement a method for configuring a node provided in the following method embodiments. In a possible implementation, if a CLI is configured on the computer device 300, the computer device 300 is configured to perform steps performed by a CLI in the following method embodiments. In a possible implementation, if a server is configured on the computer device 300, the computer device 300 is configured to perform operations performed by a server in the following method embodiments. In a possible implementation, if a system for configuring a node is configured on the computer device 300, the computer device 300 is configured to perform operations performed by devices in the following method embodiments. Certainly, the computer device 300 may further have components such as a wired or wireless network interface, a keyboard, and an input/output interface, so as to perform input/output. The computer device 300 may further include other components configured to implement a device function. Details are not described herein again.

In an example embodiment, a computer-readable storage medium is further provided, for example, a memory that includes program code. The program code may be executed by a processor in a terminal to complete a method for processing a configuration operation in the following embodiments. For example, the computer-readable storage medium is a non-transitory computer-readable storage medium such as a read-only memory (ROM), a random access memory (RAM), a compact disc read-only memory (CD-ROM), a magnetic tape, a floppy disk, and an optical data storage device.

Figure 4:
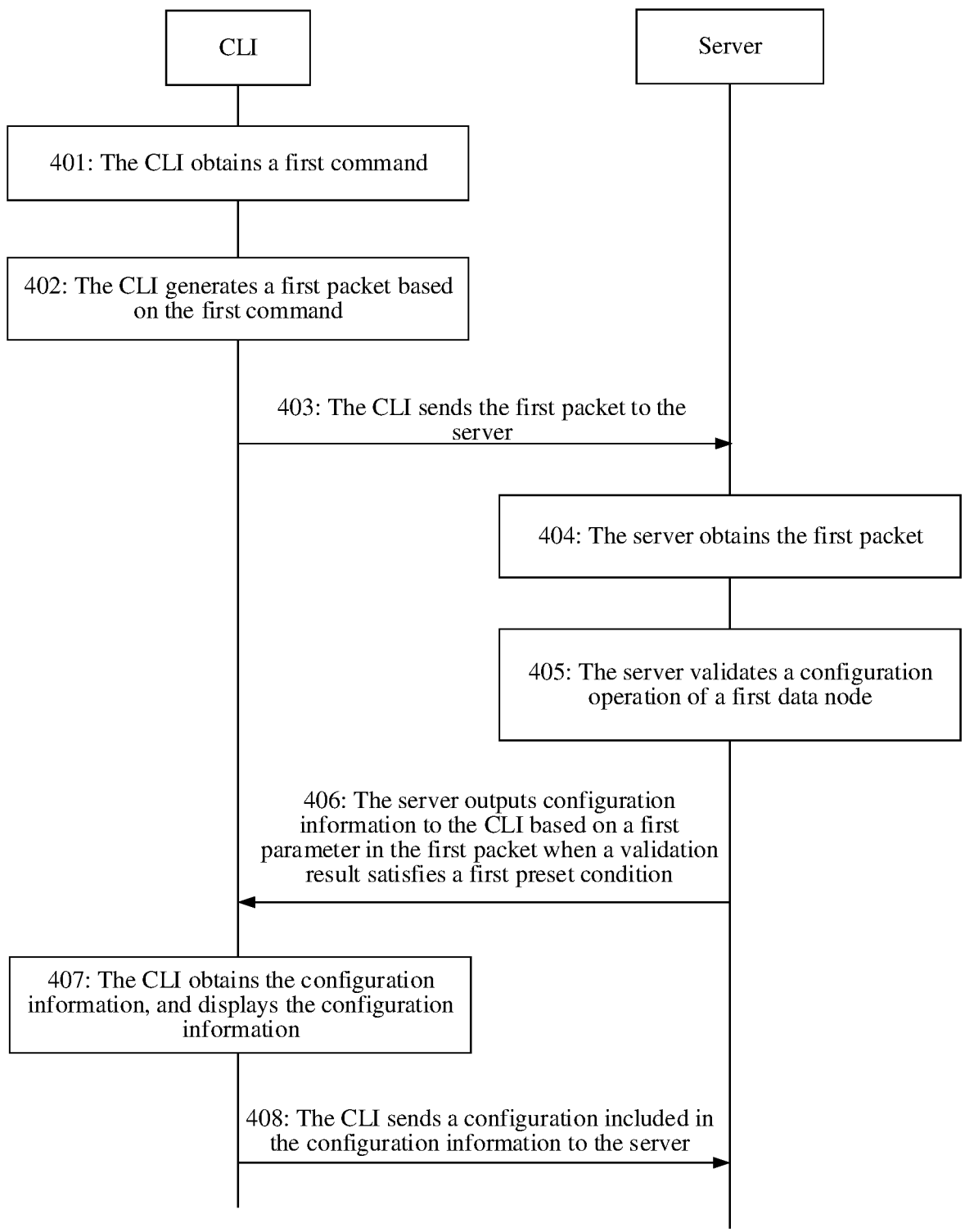
FIG. 4 is a flowchart of a method for configuring a node according to an embodiment of this application.

To further reflect a validation process of a node configuration that a CLI completes in collaboration with a server, refer to FIG. 4 that is a flowchart of a method for configuring a node according to an embodiment of this application.

401: The CLI obtains a first command.

The first command includes first information and a first parameter. The first information is for identifying a storage location of a configuration for a first data node. For example, if the first information is an identifier of a candidate dataset, the configuration for the first data node is stored in the candidate dataset, and if the first information is an identifier of a running dataset, the configuration for the first data node is stored in the running dataset.

The configuration for the first data node is any configuration stored in the storage location identified by the first information, where there is at least one configuration for the first data node; and the configuration for the first data node includes any one of deleting the first data node, creating the first data node, or configuring a parameter value of the first data node as a first configuration parameter value. The first configuration parameter value is data of any data type, for example, a value or a character string.

It should be noted that when the configuration for the first data node includes configuring the parameter value of the first data node as the first configuration parameter value, the configuration for the first data node may be a configuration of creating the first data node, or may be a configuration of modifying the parameter value of the first data node. For example, if the configuration for the first data node includes creating a data node whose parameter value is the first configuration parameter value, the configuration for the first data node is the configuration of creating the first data node, or if the configuration for the first data node includes modifying the parameter value of the first data node to the first configuration parameter value, the configuration for the first data node is the configuration of modifying the parameter value of the first data node.

The first parameter is for identifying a mode of outputting configuration information to be enabled when a first preset condition is satisfied. The first preset condition includes that the configuration for the first data node fails to pass the validation, and the output configuration information is configuration information recommended for a problem that the configuration for the first data node fails to pass the validation.

Output configuration information is different in different modes of outputting configuration information to be enabled by the first parameter. In a possible implementation, the first parameter includes a first recommended sub-parameter. The first recommended sub-parameter is for identifying a first mode or a second mode of outputting configuration information to be enabled when the first preset condition is satisfied, where the first mode is that the output configuration information includes a first configuration operation in a configuration chain, the second mode is that the output configuration information includes the configuration chain, the configuration chain includes a configuration for at least one data node, and one data node corresponds to at least one configuration. The server performs recursive recommendation (need-recursion) on the configuration chain when the configuration for the first data node does not satisfy the first preset condition.

When a value of a first sub-parameter varies, a function identified by the first sub-parameter varies. For example, when the value of the first sub-parameter is "false", the first sub-parameter is for indicating to identify the first mode of outputting the configuration information to be enabled when the first preset condition is satisfied. When the value of the first sub-parameter is "true", the first sub-parameter is for indicating to identify the second mode of outputting the configuration information to be enabled when the first preset condition is satisfied.

In a possible implementation, the first parameter includes a second sub-parameter, and the second sub-parameter is for identifying a third mode or a fourth mode of outputting configuration information to be enabled when the first preset condition is satisfied, where the third mode is outputting the configuration information, and the fourth mode is outputting the configuration information and the configuration for the first data node. When a value of a second sub-parameter varies, a function identified by the second sub-parameter varies. For example, when the value of the second sub-parameter is true, the second sub-parameter is for identifying the third mode of outputting the configuration information to be enabled when the first preset condition is satisfied. When the value of the second sub-parameter is false, the second sub-parameter is for identifying the fourth mode of outputting the configuration information to be enabled when the first preset condition is satisfied.

The first command is a commit command or a validation command. When the first command is a commit command, the identifier of the first information is an identifier of the candidate dataset, and the first command is for instructing to validate configurations in the candidate dataset, and store a configuration passing the validation in the running dataset. When the first command is a commit command, if a to-be-committed configuration indicated by the commit command is stored in the candidate dataset by default, the first command does not include the first information. When the first command is a validation command, the first command is for instructing to validate the configuration operation of the first data node. Because the validation command can instruct to validate the configuration operation in the candidate dataset, and can also instruct to validate the configuration operation in the running dataset, when the first command is the validation command, the first command includes the first information, so as to explicitly indicate a storage location in which a to-be-validated configuration is stored.

In a possible implementation, the user edits the first command in the CLI, and when the CLI detects that the user performs a confirmation operation on the first command, the CLI obtains the first command.

402: The CLI generates a first packet based on the first command, where the first packet includes the first information and the first parameter.

the first packet is a commit packet or a validate packet. When the first command is a commit command, the first packet is a commit packet, or when the first command is a validation command, the first packet is a validate packet.

In a possible implementation, if the first command is a commit command, the CLI converts the commit command into a commit packet based on a packet format of the commit packet. Alternatively, the commit packet is a RPC packet. Alternatively, the packet format of the commit packet is shown in the following pseudocode 2.

Pseudocode 2:

```
rpc commit {
if-feature candidate;
input {
leaf confirmed {
if-feature confirmed-commit;
type empty;
}
leaf confirm-timeout {
if-feature confirmed-commit;
type uint32 {
range "1..max";
}
units "seconds";
default "600"; // 10 minutes
}
leaf persist {
if-feature confirmed-commit;
type string;
}
leaf persist-id {
if-feature confirmed-commit;
type string;
}
container recommend {   # First parameter
presence "To get the recommended supplementary operation possibly if validate failed.";
        leaf need-recursion { #First sub-parameter
        type boolean;
        default true;
        }
        leaf only-supplement { #Second sub-parameter
        type boolean;
        default true;
        }
    }
   }
 }
```

The "recommend" in the pseudocode 2 is a first parameter and is a container, and "need-recursion" and "only-supplement" in the pseudocode 2 are a first sub-parameter and a second sub-parameter respectively. Both the first sub-parameter and the second sub-parameter are child nodes of the first parameter, and parameter values of "need-recursion" and "only-supplement" determine an enabled mode of outputting configuration information.

When the first command is the validation command, the CLI converts the validation command into a validate packet based on a packet format of the validate packet. Alternatively, the validate packet is a RPC packet. Alternatively, the packet format of the validate packet is shown in the following pseudocode 3.

Pseudocode 3:

```
rpc validate {
if-feature validate;
input {
container source {
choice config-source {
mandatory true;
leaf candidate {
if-feature candidate;
type empty;
}
leaf running {
type empty;
}
leaf startup {
if-feature startup;
type empty;
}
```

Pseudocode 3:

```
leaf url {
if-feature url;
type inet: uri;
}
anyxml config {
}
}
}
container recommend {
presence "To get the recommended supplementary operation possibly if validate failed.";
leaf need-recursion {
description "Whether need to recommend supplementary operation recursively.";
type boolean;
default true;
}
leaf only-supplement {
description "Whether only need the recommended supplementary operation. If 'false' is set,
all the user operations in candidate will also be returned.";
type boolean;
default true;
}
}
}
}
```

The data source input in the pseudocode 3 is a container, and the selected configuration source (choice config-source) is a data node of the data source, including a plurality of leaf nodes such as a running dataset, a candidate dataset, and a startup dataset. The plurality of leaf nodes are first information. When one leaf node of the plurality of leaf nodes is valid, the validate packet indicates to validate a configuration in a dataset represented by the leaf node. The "recommend" in the pseudocode 3 is a first parameter and is a container, and "need-recursion" and "only-supplement" in the pseudocode 3 are a first sub-parameter and a second sub-parameter respectively.

403: The CLI sends the first packet to a server.

404: The server obtains the first packet.

In a possible implementation, after obtaining the first packet, the server determines, based on a packet format of the first packet, that the first packet is a commit packet or a validate packet, and obtains the first information from the first packet, so that the server determines, based on the first information, a storage location of to-be-processed configurations, and validates the configurations in the storage location indicated by the first information. The configurations in the storage location indicated by the first information are the to-be-processed configurations. The following process shown in step 405 is a process in which the server validates any configuration operation stored in the storage location after receiving the first packet.

405: The server validates a configuration operation of the first data node.

Before creating the data structure or in a process of creating the data structure, the user predefines a logical relationship between data nodes in the data structure in the server, so that after obtaining the first packet subsequently, the server validates, based on the predefined logical relationship, each configuration in the storage location indicated by the first information.

In a possible implementation, for the configuration for the first data node, the server validates, based on a logical relationship between the first data node and a second data node included in a data structure to which the first data node belongs, the configuration operation of the first data node.

The data structure to which the first data node belongs is a data structure that is currently being created, and the second data node is any data node that is in the data structure and that has a logical relationship with the first data node.

There may be at least one logical relationship between the first data node and the second data node. Validation manners in which the server validates the configuration for the first data node based on different logical relationships are different. For details, refer to the following validation manners 1 to 7.

Validation manner 1: The logical relationship includes that the second data node references the first data node.

Alternatively, it may be understood that the predefined second data node is a child node of the first data node, and the first data node is a parent node of the second data node.

When the configuration for the first data node includes deleting the first data node, if the server subsequently runs the configuration for the first data node, the server deletes the first data node. If the second data node is created in this case, once the configuration for the first data node is subsequently run, the first data node is deleted. In this case, the second data node that has been created lacks the referenced first data node, so that the second data node does not satisfy the logical relationship. Therefore, when the configuration operation includes deleting the first data node, if the second data node is created, the server determines that the configuration for the first data node fails to pass the validation.

In a possible implementation, in the logical relationship, the second data node is modified by using a leafref function or an instance-identifier function, to indicate that a type of the second data node is the same as a type of a data node referenced by the second data node. When a value of a require-instance of the second data node in the logical relationship is "true", if a data node referenced by the second data node does not exist, the server determines that the second data node does not satisfy the logical relationship (that is, the second data node is invalid). However, the second data node does not satisfy the logical relationship because of the configuration for the first data node. Therefore, the server determines that the configuration for the first data node fails to pass the validation.

For example, the pseudocode 4 is a logical relationship between some data nodes in the acl model and the ifm model that are predefined. The validation manner 1 is described as follows:

Pseudocode 4:

```
# ifm model
container interfaces {
list interface {
key "name";
leaf name {
        type pub-type:if-name; # This data node is referenced by
the data node if-name in the acl model
        }
    }
}
# acl model
container acl {
container groups {
list group {
key "identity";
leaf identity {
type acl4-identity;
        }
```

-continued

Pseudocode 4:

```
leaf type {
type group4-type;
mandatory true;
        }
container rule-interfaces {
list rule-interface {
key "name";
unique "id";
leaf name {
type string {
length "1..32";
pattern '[^_\s][^\s]*';
        }
    }
    {
leaf id {
when "../../../match-order = 'config'";
type uint32 {
range "0..4294967294";
        }
mandatory true;
        }
leaf action {
type rule-action;
mandatory true;
        }
choice interface {
case interface-any {
leaf if-any {
type boolean;
default "false";
            }
        }
case interface-name {
leaf if-name {
type leafref {
            path "/ifm:ifm/ifm:interfaces/ifm:
interface/ifm:name"; # This data node references the data node name
in the ifm model
        }
    }
    }
    }
    }
    }
    }
    }
}
```

It can be learned from the pseudocode 4 that a data node interface-name under the container list rule-interface of the acl model references a data node name under the container interfaces of the ifm model, the data node interface-name is modified by the leafref function, and require-instance is true. For example, the data node interface-name is the second data node, and the data node name is the first data node. If the configuration for the first data node includes deleting the data node name referenced by the data node interface-name, subsequently, the data node interface-name lacks a reference node. Therefore, the configuration for the data node interface-name fails to pass the validation of the server.

In a possible implementation, the logical relationship is a logical relationship defined in the running dataset (or considered as a logical relationship that is defined by a configuration passing validation), or may be a logical relationship configured independently outside the running dataset.

A running dataset shown in the following pseudocode 5 is used as an example. As defined in the running dataset, a data node name in the ifm model is referenced by a data node if-name in the acl model.

Pseudocode 5:
```
<ifm xmlns=\"urn:xx:yang:xx-ifm\">
    <interfaces>
    <interface>
    <name>eth0</name># This data node is referenced by the data node if-name in the acl model
    </interface>
    </interfaces>
</ifm>
<acl xmlns="urn:xx:yang:xx-acl">
    <groups>
    <group>
    <identity>12</identity>
    <type>interface</type>
    <rule-interfaces>
    <rule-interface>
    <name>eth0</name>
    <id>0</id>
    <action>permit</action>
    <if-name>eth0</if-name># This data node references the data node name in the ifm model
    </rule-interface>
    </rule-interfaces>
    </group>
    </groups>
</acl>
```

When the data node name in the ifm model in the pseudocode 5 is the first data node, and the data node if-name in the acl model is the second data node, if the configuration for the first data node includes deleting the data node name in the ifm model, the configuration is, for example, represented by a configuration command: remove /ifm/interfaces/interface[name='eth0']. If the configuration is currently in the candidate dataset, once the configuration passes the validation, the configuration is subsequently committed to the running dataset. When the configuration is run, the server deletes the data node name in the ifm model. As a result, the data node if-name in the acl model lacks a reference node. If the data node if-name in the acl model lacks a reference node, the server is subsequently caused to send, to the CLI, an error packet for reporting an error, to indicate that the data node if-name in the acl model lacks the referenced node name. When receiving the error packet, the CLI displays error information indicated by the error information. For example, the error information is expressed as:
   Leafref "/xx-ifm:ifm/xx-ifm:interfaces/xx-ifm:interface/xx-ifm:name" of value "eth0" points to a non-existing leaf.".

In this case, to avoid subsequently reporting an error caused by the configuration, the configuration fails to pass the validation of the server.

Validation manner 2: The logical relationship includes that the first data node references the second data node.

In a possible implementation, when the configuration for the first data node includes creating the first data node, if the server subsequently runs the configuration for the first data node, the server creates the first data node. If the second data node is not created in this case, once the configuration for the first data node is subsequently run, the first data node that has been created lacks the referenced second data node, so that the first data node does not satisfy the logical relationship. Therefore, when the configuration for the first data node includes creating the first data node, if the second data node is not created, the server determines that the configuration for the first data node fails to pass the validation.

Validation manner 3: The logical relationship includes that the first data node and the second data node co-exist.

In a possible implementation, when the configuration for the first data node includes creating the first data node, once the server subsequently performs the configuration operation, the server creates the first data node. If the second data node is not created in this case, once the configuration for the first data node is run subsequently, the second data node and the first data node do not coexist, that is, the first data node does not satisfy the logical relationship. Therefore, when the configuration for the first data node includes creating the first data node, if the second data node is not created, the server determines that the configuration for the first data node fails to pass the validation.

In a possible implementation, the second data node is a child node of the first data node. Alternatively, a child node of a data node is modified by using a mandatory function, so as to define that when the data node instance exists, the child node needs to also exist, which may be understood as defining that the data node and the child node of the data node coexist. When the second data node in the first data node in the logical relationship is modified by the mandatory function, that is, the first data node and the second data node are required to coexist. Once the first data node and the second data node do not coexist, it indicates that the logical relationship is not satisfied.

A logical relationship indicated by the following pseudocode 6 is used as an example, to describe the validation manner 3 as follows:

Pseudocode 6:

```
container acl {
container groups {
list group {
key "identity";
leaf identity {
type acl4-identity;
    }
leaf type {
type group4-type;
        mandatory true;# This data node is modified by mandatory
    }
  }
 }
}
```

It can be learned from the pseudocode 6 that, a data node type in the data node group is modified by the mandatory function, that is, the data node type and the data node group are required to coexist. In this case, the first data node is the data node group, and the second data node is the data node type. If the configuration for the first data node includes creating the data node group, the configuration is, for example, represented by the following configuration command:
   touch/xx-acl:acl/groups/group[identity='12'], to instruct to configure a parameter value of a data node identity in the data node group as 12.

If the running dataset is empty in this case, once the configuration passes the validation, the configuration is subsequently committed to the running dataset. When this configuration is run, the server configures the parameter value of the data node identity as 12 in the data node group. The data node type in the data node group is modified by the mandatory function. Therefore, if the data node type is not created in this case, the data node group and data node type do not coexist once the configuration is run subsequently. If the data node group and the data node type do not coexist, the server is subsequently enabled to send, to the CLI, an error packet for reporting an error, to indicate that the data node type is missing in the data node group. When receiving the error packet, the CLI displays error information indicated by the error packet, so as to indicate that the data node type is missing in the data node group. For example, the error information is expressed as: Missing required element "type" in "group". In this case, to avoid subsequently reporting an error caused by the configuration, the configuration fails to pass the validation of the server.

Validation manner 4: The logical relationship includes that the second data node is valid when the parameter value of the first data node satisfies a second preset condition.

Alternatively, the second preset condition includes that the parameter value of the first data node is the second configuration parameter value, that is, the logical relationship includes that the second data node is valid when the parameter value of the first data node is the second configuration parameter value.

In a possible implementation, when the configuration for the first data node includes configuring the parameter value of the first data node as the first configuration parameter value, if the server subsequently runs the configuration for the first data node, the server configures the parameter value of the first data node as the first configuration parameter value. If the first configuration parameter value does not satisfy the second preset condition (that is, the first configuration parameter value is different from the second configuration parameter value), once the configuration for the first data node is subsequently run, the parameter value of the first data node does not satisfy the second preset condition, to indirectly cause the second data node to be invalid. When the logical relationship includes that the second data node is valid when the parameter value of the first data node satisfies a second preset condition, if the first configuration parameter value does not satisfy the second preset condition, the server determines that the configuration for the first data node fails to pass the validation.

In a possible implementation, in the logical relationship, the second preset condition is defined by using a when function. Once the configuration for the first data node is run, if the parameter value of the first data node does not satisfy the second preset condition defined by the when function, the second data node is invalid. Therefore, the first data node does not satisfy the logical relationship.

With reference to the following pseudocodes 7 and 8, the validation manner 4 is described as follows:

Pseudocode 7:

```
container aaa {
container authorization-schemes {
list authorization-scheme {
key "author-scheme-name";
leaf author-scheme-name {
type string {
length "1..32";
    }
   }
leaf no-response-policy {
type author-no-res-policy-type;
default "online";
   }
leaf no-response-times {
when "../no-response-policy='offline"; #Define that the data
node no-response-times is valid when the parameter value of the data
node no-response-policy is offline
type uint32 {
range "1..10";
    }
   }
  }
 }
}
```

Pseudocode 8:

```
<aaa xmlns="urn:xx:yang:xx-aaa">
<authorization-schemes>
<authorization-scheme>
<author-scheme-name>12</author-scheme-name>
<no-response-policy>online</no-response-policy>#The
```

-continued

```
parameter value of the data node no-response-policy is online
     </authorization-scheme>
     </authorization-schemes>
     </aaa>
```

The pseudocode 7 includes the logical relationship, and the pseudocode 8 is a current running dataset. It can be learned from the logical relationship shown in the pseudocode 7 that the when function defines that the data node no-response-times is valid when the parameter value of the data node no-response-policy is offline. In this case, for example, the first data node is a data node no-response-policy, the second preset condition includes that a parameter value of the data node no-response-policy is offline, and the second data node is a data node no-response-times. If the configuration for the first data node includes configuring a parameter value of the data node no-response-times as 12, for example, the configuration may be represented by the following configuration command:

touch/aaa/authorization-schemes/authorization-scheme
 [author-scheme-name="12"]/no-response-times 1.

Because the parameter value of the data node no-response-times in the running dataset is offline in this case, once the configuration passes the validation of the server, the configuration is subsequently committed to the running dataset. When this configuration is run, the server configures the parameter value of the data node no-response-times as 12. The logical relationship shown in the pseudocode 7 defines that when the data node no-response-policy is configured as offline, the data node no-response-times is valid. Therefore, once the configuration is run subsequently, the parameter value of the data node no-response-policy is 12 but not offline, that is, the data node offline is invalid, and the server is subsequently caused to send, to the CLI, an error packet for reporting an error. When receiving the error packet, the CLI displays error information indicated by the error packet, to indicate that the parameter value of the data node no-response-policy does not satisfy the second preset condition. For example, the error information is expressed as: When condition " . . . /no-response-policy='offline'" not satisfied. In this case, to avoid subsequently reporting an error caused by the configuration, the configuration fails to pass the validation of the server.

Validation manner 5: The logical relationship includes: When a parameter value of at least one data node of a plurality of data nodes included in the data structure satisfies a third preset condition, the second data node is valid.

The plurality of data nodes include the first data node. The plurality of data nodes are some data nodes in the data structure. The third preset condition includes parameter values of the plurality of data nodes.

In a possible implementation, when the configuration for the first data node includes configuring the parameter value of the first data node as the first configuration parameter value, once subsequently running the configuration for the first data node, the server configures the parameter value of the first data node as the first configuration parameter value. In this case, when no data node that satisfies the third preset condition exists in the plurality of data nodes, if the first configuration parameter value does not satisfy the third preset condition, no data node that satisfies the third preset condition exists in the plurality of data nodes once the configuration for the first data node is subsequently run. As a result, the second data node is invalid. Therefore, when no data node that satisfies the third preset condition exists in the plurality of data nodes, if the first configuration parameter value does not satisfy the third preset condition, the server determines that the configuration for the first data node fails to pass the validation.

It should be noted that when the configuration for the first data node is validated, if the candidate dataset stores a configuration for any data node of the plurality of data nodes other than the first data node, and a parameter value of the any data node in the configuration for the any data node satisfies the third preset condition, it indicates that if the configuration for the any data node is subsequently run, the third preset condition can also be satisfied, and the configuration for the first data node passes the validation of the server.

In a possible implementation, in the logical relationship, the third preset condition is defined by using a must function. If the configuration for the first data node is run, no data node that satisfies the third preset condition exists in the plurality of data nodes, and the first data node does not satisfy the logical relationship.

With reference to the following pseudocodes 9 and 10, the validation manner 5 is described as follows:

---
Pseudocode 9:
---

```
container aaa {
container task-groups {
list task-group {
key "name";
leaf name {
type string {
length "1..32";
  }
 }
 }
}
container task-group-task-maps {
list task-group-task-map {
key "task-group-name task-name";
leaf task-group-name {
type leafref {
path "../../../task-groups/task-group/name";
  }
 }
leaf task-name {
type string {
 }
length "1..32";
 }
must "(../write or../execute or../debug or../read)";
 }
leaf read {
type aaa-enable-type;
must "not(../write='disable' and ../execute='disable' and ../debug='disable') or (../write='disable' and ../execute='disable' and ../debug='disable' and ../read!=../write)";#must function, defining a third preset condition
default "disable";
 }
leaf write {
type aaa-enable-type;
default "disable";
 }
leaf execute {
type aaa-enable-type;
default "disable";
 }
leaf debug {
type aaa-enable-type;
default "disable";
 }
 }
 }
}
```

---
Pseudocode 10:
---

```
<aaa xmlns="urn:xx:yang:xx-aaa">
<task-groups>
<task-group>
<name>1</name>
</task-group>
</task-groups>
<task-group-task-maps>
<task-group-task-map>
<task-group-name>1</task-group-name>
<task-name>2</task-name>
<read>enable</read>#The parameter value of the data node read is enable
<write>enable</write>#The parameter value of the data node write is enable
</task-group-task-map>
</task-group-task-maps>
</aaa>
```

The pseudocode 9 includes the logical relationship. It can be learned from the logical relationship shown in the pseudocode 9 that the must function defines that the data node read is valid when a parameter value of at least one data node of the data node write, the data node execute, and the data node debug is not disable. The pseudocode 10 is a current running dataset. It can be learned from the pseudocode 10 that parameter values of the data node read and the data node write in the current running dataset are both enable. If the configuration for the first data node includes configuring the parameter values of both the data node read and the data node write as disable, the configuration is, for example, indicated by the following configuration command:

touch/xx-aaa:aaa/task-group-task-maps/task-group-task-map[task-group-name="1"][task-name="2"]/write disable touch/xx-aaa:aaa/task-group-task-maps/task-group-task-map[task-group-name="1"][task-name="2"]/read disable.

In this case, the data node write is the first data node. Because the parameter values of the data node read and the data node write in the running dataset are both enable, once a configuration corresponding to the configuration command passes the validation of the server, the configuration is subsequently committed to the running dataset. When this configuration is run, the server configures the parameter value of the data node write as disable. The logical relationship defines that the data node read is valid when a parameter value of at least one data node of the data node write, the data node execute, and the data node debug is not disable. Therefore, once the configuration is run, the parameter value of the data node write is disable. In addition, in this case, neither the data node execute nor the data node debug in the running dataset is created. Finally, as a result, a parameter value of at least one data node of the data node write, the data node execute, and the data node debug is disable, to cause the data node read to be invalid, and cause the server to send, to the CLI, an error information for reporting an error. When receiving the error packet, the CLI displays error information indicated by the error packet, to indicate that a parameter value of at least one data node of the plurality of data nodes does not satisfy the third preset condition. For example, the error information is expressed as:

Must condition "not ( . . . /write='disable' and . . . / execute='disable' and . . . /debug='disable') or ( . . . / write='disable' and . . . /execute='disable' and . . . / debug='disable' and . . . /read!= . . . /write)" not satisfied.

In this case, to avoid a problem of subsequently reporting an error caused by the configuration, the configuration fails to pass the validation of the server.

It should be noted that the validation manners 4 and 5 are described above by using an example in which the configuration for the first data node fails to pass the validation of the server when the configuration for the first data node includes configuring the parameter value of the first data node as the first configuration parameter value. In another possible implementation, when the configuration for the first data node includes deleting the first data node, the first data node may not satisfy the second preset condition and at least one data node of the plurality of second data nodes may not satisfy the third preset condition. Therefore, the configuration for the first data node fails to pass the validation of the server. By using an example in which based on the foregoing pseudocodes 7 and 8, the logical relationship includes that the data node no-response-times is valid when the parameter value of the data node no-response-policy is offline, if the configuration for the first data node includes deleting the data node no-response-policy, once the server subsequently deletes the data node no-response-policy due to running the configuration, the parameter value of the first data node is not offline. Therefore, the data node no-response-times is invalid, and the server subsequently reports an error to the CLI. To avoid subsequent error reporting, the configuration for the first data node fails to pass the validation of the server. By using an example in which based on the foregoing pseudocodes 9 and 10, the logical relationship includes that the data node read is valid when a parameter value of at least one data node of the data node write, the data node execute, and the data node debug is not disable, if the configuration for the first data node includes deleting the data node write, once the server subsequently deletes the data node write due to running the configuration, the data node write does not exist in the running dataset. Because neither the data node execute nor the data node debug is created, none of parameter values of the data node write, the data node execute, and the data node debug satisfies the third preset condition, to cause the data node read to be invalid and subsequent error reporting. To avoid subsequent error reporting, the configuration failed to pass the validation of the server.

Validation manner 6: The logical relationship includes that a parameter value of the second data node has a unique attribute.

In this case, the second data node is any data node having a unique attribute in the predefined data structure. A parameter value of any data node having a unique attribute should be globally unique.

when the configuration for the first data node includes configuring the parameter value of the first data node as the first configuration parameter value, if the server subsequently runs the configuration for the first data node, the server configures the parameter value of the first data node as the first configuration parameter value. In this case, if the parameter value of the second data node is the first configuration parameter value, and if the parameter value of the second data node and the parameter value of the first data node are each the first configuration parameter value after the configuration for the first data node is run, the parameter value of the second data node does not have a unique attribute. Therefore, the logical relationship cannot be satisfied. Therefore, when the parameter value of the second data node is the first configuration parameter value, if the configuration for the first data node includes configuring the parameter value of the first data node as the first configuration parameter value, the server determines that the configuration for the first data node fails to pass the validation.

In a possible implementation, in the logical relationship, the second data node is modified by using the unique function, to identify that the parameter value of the second data node has a unique attribute. If the configuration for the first data node is run, the parameter value of the first data node is the same as that of the second data node. Therefore, the second data node does not satisfy the logical relationship.

With reference to the following pseudocodes 11 and 12, the validation manner 6 is described as follows:

Pseudocode 11:

```
container acl {
container groups {
list group {
key "identity";
leaf identity {
type acl4-identity;
}
leaf type {
type group4-type;
mandatory true;
}
container rule-interfaces {
list rule-interface {
key "name";
        unique "id";#The data node id has a unique attribute
leaf name {
type string {
length "1..32";
pattern '[^_\s][^\s]*';
}
}
leaf id {
when "../../../match-order = 'config'";
type uint32 {
range "0..4294967294";
}
mandatory true;
}
}
}
}
}
```

Pseudocode 12:

```
<acl xmlns="urn:xx:yang:xx-acl">
<groups>
<group>
<identity>12</identity>
<type>interface</type>
<rule-interfaces>
<rule-interface>
<name>eth0</name>
<id>0</id>#The parameter value of the data node id is 0
</rule-interface>
</rule-interfaces>
</group>
</groups>
</acl>
```

The pseudocode 11 includes the logical relationship. It can be learned from the logical relationship shown by the pseudocode 11 that the parameter value of the data node id has a unique attribute. The pseudocode 12 is a current running dataset. It can be learned from the pseudocode 12 that the parameter value of the data node id in the current running dataset is 0. If the configuration for the first data node includes configuring the parameter value of the child node name in the data node rule-interface as the parameter value 0 of the data node id, the configuration is, for example, indicated by the following configuration command:

touch/acl/groups/group[identity='12']/rule-interfaces/rule-interface[name='eth1']/id 0.

In this case, the child node name is the first data node, and the data node id is the second data node. Because the parameter value of the data node id in the running dataset is 0 in this case, once the configuration passes the validation of the server, the configuration is subsequently committed to the running dataset. When this configuration is run, the server configures the parameter value of the child node name as 0. Because the logical relationship defines that the data node id has a unique attribute, and parameter values of the data node id and the child node name are the same once the configuration is run, the data node id does not have a unique attribute, that is, the data node id does not satisfy the logical relationship. Subsequently, the server sends, to the CLI, an error packet for reporting an error. When receiving the error packet, the CLI displays error information indicated by the error packet, to indicate that the data node id does not have a unique attribute and conflicts with the child node name in parameter value. For example, the error information is expressed as:

Unique data leaf(s) "id" not satisfied in "/xx-acl:acl/groups/group[identity='12']/rule-interfaces/rule-interface[name='eth0']" and "/xx-acl:acl/groups/group[identity='12']/rule-interfaces/rule-interface[name='eth1']".

In this case, to avoid subsequently reporting an error caused by the configuration, the configuration fails to pass the validation of the server.

Validation manner 7: The logical relationship includes that the quantity of the first data nodes in the second data node falls within a target range.

In this case, the first data node is a data node of a leaf list or list type, and the first data node is a child node of the second data node. Alternatively, it may be understood that the first data node is an element of the second data node. The target range includes a quantity less than or equal to a first target quantity (that is, a maximum quantity of first data nodes), and/or the target range includes a quantity greater than or equal to a second target quantity (that is, a minimum quantity of first data nodes). Both the first target quantity and the second target quantity are integers greater than or equal to 1.

In a possible implementation, when the configuration for the first data node includes creating a first quantity of first data nodes in the second data node, if the server subsequently runs the configuration for the first data node, the server creates the first quantity of first data nodes in the second data node. In this case, if the first quantity does not fall within the target range, and if the quantity of first data nodes in the second data nodes does not fall within the target range after the configuration for the first data node is run, the first data node does not satisfy the logical relationship. Therefore, when the configuration for the first data node includes creating the first quantity of first data nodes in the second data node, if the first quantity does not fall within the target range, the server determines that the configuration for the first data node fails to pass the validation.

In a possible implementation, in the logical relationship, the quantity of first data nodes is defined by using a min-elements function and/or a max-elements function, so as to identify the target range. The min-elements function is for defining a minimum quantity of first data nodes, and the max-elements function is for defining a maximum quantity of first data nodes. If the quantity of first data nodes in the second data nodes does not fall within the target range because of running the configuration for the first data node, the first data node does not satisfy the logical relationship.

With reference to the following pseudocode 13, the validation manner 7 is described as follows:

Pseudocode 13:

container bras-vas {
container tariff-queue-mapping {
presence "Tariff queue mapping.";
leaf-list tariff-level {
type bras-vas-flow-queue-type;
    min-elements "8";# The minimum quantity of data nodes tariff-level is 8
    max-elements "8";# The maximum quantity of data nodes tariff-level is 8
ordered-by user;
  }
}
}

The pseudocode 13 includes the logical relationship. It can be learned from the logical relationship shown by the pseudocode 13 that both the maximum quantity and the minimum quantity of data nodes tariff-level are 8. If the configuration for the first data node includes creating one data node tariff-level in a container tariff-queue-mapping, the configuration is, for example, represented by the following configuration command:

touch/bras-vas/tariff-queue-mapping/tariff-level be.

In this case, the data node tariff-level is the first data node, and the container tariff-queue-mapping is the second data node. If the running dataset is empty, once the configuration for the data node tariff-level passes the validation of the server, the configuration is subsequently committed to the running dataset. When this configuration is run, the container tariff-queue-mapping contains one data node tariff-level, and the quantity of data nodes tariff-level in the container tariff-queue-mapping is less than eight. In this case, the data node tariff-level does not satisfy the logical relationship. Subsequently, the server sends, to the CLI, an error packet for reporting an error. When receiving the error packet, the CLI displays error information indicated by the error packet, to indicate that the quantity of data nodes tariff-level does not fall within the target range. For example, the error information is expressed as: Too few "tariff-level" elements, to indicate that the quantity of data nodes tariff-level is too small. In this case, to avoid subsequently reporting an error caused by the configuration, the configuration fails to pass the validation of the server.

In a possible implementation, the process shown in step 405 is performed by a validation module in the server. When the validation module determines that the configuration for the first data node fails to pass the validation, it indicates that the configuration for the first data node satisfies the first preset condition. If the first packet includes the first parameter, it indicates that the mode of outputting configuration information needs to be enabled when the first preset condition is satisfied, the validation module sends the configuration for the first data node to a recommendation module in the server, and the recommendation module returns recommended configuration information to the CLI by performing the following step 406, so as to resolve a problem that the configuration for the first data node fails to pass the validation.

406: The server outputs configuration information to the CLI based on the first parameter in the first packet when a validation result satisfies the first preset condition.

The configuration information is for resolving a problem caused by the configuration for the first data node, and the configuration information includes a configuration recommended by the server, so as to resolve the problem caused by the configuration for the first data node. Alternatively, it may be understood that the configuration information is for resolving a problem that the first data node fails to pass the validation, and the configuration information includes a configuration that is recommended by the server to the CLI when the configuration for the first data node fails to pass the validation, so that the configuration for the first data node can pass the validation.

In a possible implementation, the configuration included in the configuration information may cause a new problem. Therefore, the problem caused by the configuration for the first data node includes a direct problem and an indirect problem. The direct problem is a problem directly caused by the configuration for the first data node, and the indirect problem is a problem caused by the configuration in the configuration information.

Alternatively, the configuration information includes a first configuration in the configuration chain or the configuration chain. The configuration chain includes a configuration for at least one data node, one data node corresponds to at least one configuration, and the configuration chain is for resolving a direct problem and an indirect problem that are caused by the configuration. The first configuration in the configuration chain is for resolving a direct problem caused by the configuration for the first data node. For any configuration other than the first configuration in the configuration chain, the any configuration is for resolving a direct problem caused by a previous configuration of the any configuration in the configuration chain.

In a possible implementation, the process shown in step 406 is implemented through the following processes shown in steps 4061 to 4062.

Step 4061: The server obtains a first result based on a logical relationship between the first data node and a second data node included in a data structure to which the first data node belongs, where the first result includes a reason why the configuration for the first data node fails to pass the validation.

When there are different logical relationships, the server obtains different first results based on the different logical relationships. For details, refer to the following obtaining processes 1 to 7.

Obtaining process 1: The logical relationship includes that the second data node references the first data node in the data tree.

When the second data node has been created and the configuration for the first data node includes deleting the first data node, if the configuration is subsequently run, the second data node lacks the referenced first data node, and the logical relationship cannot be satisfied. Therefore, if the second data node has been created, the server obtains the reason based on the logical relationship, where the reason includes that the second data node lacks the referenced first data node.

By using an example in which the logical relationship includes the pseudocode 5 in the validation manner 1, if the configuration for the first data node includes deleting the data node name in the ifm model, the reason obtained by the server based on the logical relationship shown in the pseudocode 5 includes that the data node if-name in the acl model lacks the referenced data node name.

Obtaining process 2: The logical relationship includes that the first data node references the second data node.

When the second data node is not created and the configuration for the first data node includes creating the first data node, if the configuration for the first data node is subsequently run, the first data node that is subsequently created lacks the referenced second data node, and the logical relationship cannot be satisfied. Therefore, if the second data node has not been created, the server obtains the reason based on the logical relationship, where the reason includes that the first data node lacks the referenced second data node.

Obtaining process 3: The logical relationship includes that the first data node and the second data node co-exist.

When the second data node is not created and the configuration for the first data node includes creating the first data node, if the configuration for the first data node is subsequently run, the second data node and the first data node cannot coexist, and the logical relationship cannot be satisfied. Therefore, if the second data node has not been created, the server obtains the reason based on the logical relationship, where the reason includes that the second data node is missing.

By using an example in which the logical relationship includes the pseudocode 6 in the validation manner 3, if the configuration for the first data node includes creating the data node group, the reason obtained by the server based on the logical relationship shown in the pseudocode 6 includes that the data node type is missing in the data node group.

Obtaining process 4: The logical relationship includes that the second data node is valid when the parameter value of the first data node satisfies a second preset condition.

When the configuration for the first data node includes configuring the parameter value of the first data node as the first configuration parameter value, if the first configuration parameter value does not satisfy the second preset condition, and the parameter value of the first data node does not satisfy the second preset condition even if the configuration for the first data node is subsequently run, the second data node is caused to be invalid, and the logical relationship cannot be satisfied. When the logical relationship includes that the second data node is valid when the parameter value of the first data node satisfies a second preset condition, if the first configuration parameter value does not satisfy the second preset condition, the server obtains the reason based on the logical relationship, where the reason includes that the parameter value of the first data node does not satisfy the second preset condition.

By using an example in which the logical relationship includes the pseudocode 7 in the validation manner 4, if the configuration for the first data node includes configuring a parameter value of the data node no-response-times as 12, the reason obtained by the server based on the logical relationship shown in the pseudocode 7 includes that the parameter value of the data node no-response-policy does not satisfy the second preset condition (that is, the parameter value is not offline).

It should be noted that when the configuration for the first data node includes deleting the first data node, if the configuration for the first data node is subsequently run, the first data node is deleted, and the second data node is invalid. Therefore, if the configuration for the first data node is subsequently run, the server obtains the reason based on the logical relationship, where the reason includes that the parameter value of the first data node does not satisfy the second preset condition.

Obtaining process 5: The logical relationship includes that the second data node is valid when a parameter value of at least one data node of a plurality of data nodes included in the data structure satisfies a third preset condition, where the plurality of data nodes include the first data node.

When the configuration for the first data node includes configuring the parameter value of the first data node as the first configuration parameter value, if no data node that satisfies the third preset condition exists in the plurality of data nodes in this case, and the first configuration parameter value does not satisfy the third preset condition even if the configuration for the first data node is subsequently run, no data node that satisfies the third preset condition still exists in the plurality of data nodes, to cause the second data node to be invalid, and the logical relationship cannot be satisfied. Therefore, when no data node that satisfies the third preset condition exists in the plurality of data nodes, if the first configuration parameter value does not satisfy the third preset condition, the server obtains, based on the logical relationship, a reason why the configuration for the first data node fails to pass the validation, where the reason why the configuration for the first data node fails to pass the validation includes that a parameter value of at least one data node in the plurality of data nodes does not satisfy the third preset condition.

By using an example in which the logical relationship includes the pseudocode 9 in the validation manner 5, if the configuration for the first data node includes configuring both the parameter value of the data node read and the parameter value of the data node write as disable, the reason obtained by the server based on the logical relationship shown in the pseudocode 9 includes that a parameter value of at least one data node of the data node write, the data node execute, and the data node debug does not satisfy the third preset condition.

It should be noted that when the configuration for the first data node includes deleting the first data node, if only the first data node of the plurality of data nodes is a created data node, the first data node is deleted once the configuration for the first data node is run, and therefore no data node that satisfies the third data preset condition exists in the plurality of data nodes. Therefore, when the configuration for the first data node includes deleting the first data node, if only the first data node of the plurality of data nodes is a created data node, the server obtains, based on the logical relationship, a reason why the configuration for the first data node fails to pass the validation, where the reason why the configuration for the first data node fails to pass the validation includes that a parameter value of at least one data node in the plurality of data nodes does not satisfy the third preset condition.

Obtaining process 6: The logical relationship further includes that a parameter value of the second data node has a unique attribute.

When the parameter value of the second data node is the first configuration parameter value, and the configuration for the first data node includes configuring the parameter value of the first data node as the first configuration parameter value, if the configuration for the first data node is subsequently run, the parameter value of the first data node conflicts with the parameter value of the second data node. Therefore, if the parameter value of the second data node is the first configuration parameter value, the server obtains the reason based on the logical relationship, where the reason is that the parameter value of the first data node conflicts with the parameter value of the second data node.

By using an example in which the logical relationship includes the pseudocode 11 in the validation manner 6, if the configuration for the first data node includes configuring the parameter value of the child node name in the data node rule-interface as the parameter value 0 of the data node id, the reason obtained by the server based on the logical relationship shown in the pseudocode 11 includes that the parameter value of the data node id conflicts with the parameter value of the child node name.

Obtaining process 7: The logical relationship includes that the quantity of the first data nodes in the second data node falls within a target range.

When the configuration for the first data node includes creating a first quantity of first data nodes in the second data node, if the configuration for the first data node is subsequently run, the server creates the first quantity of first data nodes in the second data node. If the first quantity does not fall within the target range, the server obtains the reason based on a logical relationship between the first data nodes, where the reason includes that the quantity of the first data nodes does not fall within the target range.

In a possible implementation, if the target range includes a quantity less than or equal to a first target quantity, and the first quantity is greater than the first target quantity, the reason includes that the quantity of first data nodes is greater than the first target quantity.

In another possible implementation, if the target range includes a quantity greater than or equal to a second target quantity, and the first quantity is less than the second target quantity, the reason includes that the quantity of first data nodes is less than the second target quantity.

By using an example in which the logical relationship includes the pseudocode 13 in the validation manner 7, if the configuration for the first data node includes creating one data node tariff-level in a container tariff-queue-mapping, the reason obtained by the server based on the logical relationship shown in the pseudocode 13 includes that the quantity of data nodes tariff-level is less than 8.

Step 4062: The server outputs the configuration information based on the first result.

In a possible implementation, the server determines the configuration information based on the first result, generates a recommend packet based on the configuration information, and outputs the recommend packet to the CLI. The recommend packet includes the configuration information. Optionally, the recommend packet is any type of packet. A packet type of the recommend packet is not limited in this embodiment of this application.

If the first parameter in the first packet includes a first sub-parameter, and the first sub-parameter is for identifying a first mode of outputting configuration information to be enabled when the first preset condition is satisfied, that is, the first configuration in the recommended configuration chain is output, the configuration information is the first configuration.

When the configuration information is the first configuration, configuration information output by the server based on different reasons included in the first result is different. By using the following first type of configuration information to seventh type of configuration information, different configuration information output by the server based on different reasons is described as follows:

First type of configuration information: If the reason why the configuration for the first data node fails to pass the validation includes that the second data node lacks the referenced first data node, the configuration information includes deleting the second data node.

The logical relationship includes that the second data node references the first data node, and the configuration for the first data node includes deleting the first data node. Therefore, to avoid a case that the second data node lacks the referenced first data node after the first data node is deleted, the server determines, based on the reason, that the configuration information includes creating the second data node, generates a recommend packet based on the configuration information, and sends the recommend packet to the CLI.

Based on the example in the obtaining process 1, if the reason includes that the data node if-name in the acl model lacks the referenced data node name, because the second data node is a child node of the first data node in this case, to avoid a case that the data node if-name lacks the referenced data node, the server determines that the configuration information includes deleting the data node if-name, and generates, based on the configuration information, a recommend packet shown in the following pseudocode 14.

Pseudocode 14:
<recommended xmlns="urn:ietf:params:xml:ns:netconf:base:1.0">
<acl xmlns="urn:xx:yang:xx-acl">
<groups>
<group>
<identity>12</identity>
<type>interface</type>
<rule-interfaces>
<rule-interface>
<name>eth0</name>
<if-name xmlns:nc="urn:ietf:params:xml:ns:netconf:base:1.0" nc:operation="remove"/> #: remove indicates to delete the data node modified by the command line, that is, delete the data node if-name
</rule-interface>
</rule-interfaces>
</group>
</groups>
</acl>
</recommended>

Second type of configuration information: If the reason why the configuration for the first data node fails to pass the validation includes that the first data node lacks the referenced second data node, the configuration information includes creating the second data node.

Because the logical relationship includes that the first data node references the second data node, and in this case, the second data node is not created, to avoid a case that the first data node lacks, after having been created, the referenced second data node, the server determines, based on the reason, that the configuration information includes creating the second data node, generates a recommend packet based on the configuration information, and sends the recommend packet to the CLI.

It should be noted that both the first type of configuration information and the second type of configuration information are configurations for resolving reference relationship errors. In a possible implementation, for error types of reference relationship errors, the server determines configuration information through a parallel processing procedure.

Figure 5:
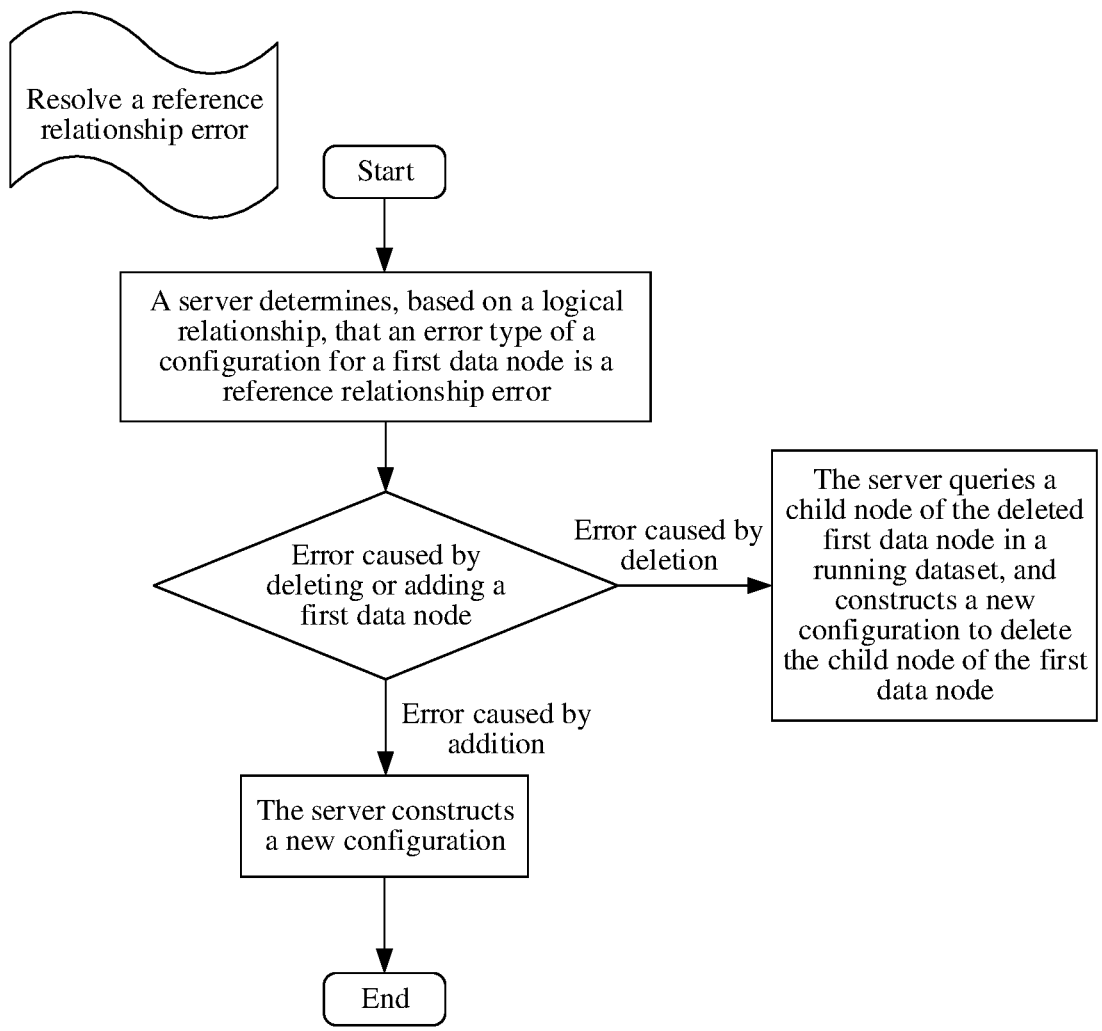
FIG. 5 shows a process of determining configuration information based on a reference relationship error according to an embodiment of this application.

For example, a process of determining configuration information based on a reference relationship error according to an embodiment of this application is shown in FIG. 5. The server determines, based on the logical relationship, that an error type of the configuration for the first data node is a reference relationship error, for example, a leafref-type error or an instance-identifier-type error. Then, the server determines that the error is caused by deleting or adding a first data node. If a child node lacks reference because of deleting the first data node, the server queries the child node of the deleted first data node in the running dataset, and constructs a new configuration to delete the child node of the first data node (the new configuration is also configuration information). If the first data node lacks reference because of adding the first data node, the server constructs a new configuration to create a parent node of the first data node.

Third type of configuration information: If the reason why the configuration for the first data node fails to pass the validation includes that the first data node lacks the second data node, the configuration information includes creating the second data node.

Because the logical relationship includes that the first data node and the second data node coexist, and in this case, the second data node is not created, to avoid a case that the first data node cannot coexist, after having been created, with the second data node, the server determines, based on the reason, that the configuration information includes creating the second data node, generates a recommend packet based on the configuration information, and sends the recommend packet to the CLI.

Based on the example in the obtaining process 3, if the reason includes that the data node type is missing in the data node group, the server determines, based on the reason, that the configuration information includes creating the data node type, and generates, based on the configuration information, a recommend packet shown in the following pseudocode 15.

Pseudocode 15:
<recommended xmlns="urn:ietf:params:xml:ns:netconf:base:1.0">
<acl xmlns="urn:xx:yang:xx-acl">
<groups>
<group>
<identity>12</identity>
<type>interface</type>#Create a data node interface whose parameter value is interface
</group>
</groups>
</acl>
</recommended>

Fourth type of configuration information: If the reason why the configuration for the first data node fails to pass the validation includes that the parameter value of the first data node does not satisfy the second preset condition, the configuration information includes configuring the parameter value of the first data node to satisfy the second preset condition.

The logical relationship includes that the parameter value of the first data node does not satisfy the second preset condition. Therefore, to avoid a case that the parameter value of the first data node does not satisfy the second preset condition, the server determines, based on the reason, that the configuration information includes configuring the parameter value of the first data node to satisfy the second preset condition, generates a recommend packet based on the configuration information, and sends the recommend packet to the CLI. For example, if the second preset condition includes that the parameter value of the first data node is a second configuration parameter value, the configuration information includes configuring the parameter value of the first data node as the second configuration parameter value.

Based on the example in the obtaining process 4, if the reason includes that the parameter value of the data node no-response-policy does not satisfy the second preset condition (the parameter value is not offline), the server determines, based on the reason, that the configuration information includes configuring a parameter value of the data node no-response-policy as offline, and generates, based on the configuration information, a recommend packet shown in the following pseudocode 16.

Pseudocode 16:
    <recommended xmlns="urn:ietf:params:xml:ns:netconf:base:1.0">
    <aaa xmlns="urn:xx:yang:xx-aaa">
    <authorization-schemes>
    <authorization-scheme>
    <author-scheme-name>12</author-scheme-name>
    <no-response-policy>offline</no-response-policy>#The parameter value of the data node no-response-policy is configured as offline
    </authorization-scheme>
    </authorization-schemes>
    </aaa>
    </recommended>

It should be noted that if the second preset condition is not a condition that the first data node needs to satisfy, it indicates that the first data node does not necessarily exist, and the configuration information includes deleting the first data node. For example, if the data node no-response-policy in the pseudocode 7 is modified by using the when function, it indicates that the data node no-response-policy does not necessarily exist, and the configuration information includes deleting the data node no-response-policy.

Fifth type of configuration information: If the reason why the configuration for the first data node fails to pass the validation includes that a parameter value of at least one data node of the plurality of data nodes does not satisfy a third preset condition, the configuration information includes creating a third data node that has not been created in the plurality of data nodes and configuring a parameter value of the third data node to satisfy the third preset condition.

To avoid a case that the second data node is caused to be invalid when a parameter value of at least one data node of the plurality of data nodes does not satisfy the third preset condition, the server determines, based on the reason, that the configuration information includes creating a third data node that has not been created in the plurality of data nodes and configuring a parameter value of the third data node to satisfy the third preset condition, generates a recommend packet based on the configuration information, and sends the recommend packet to the CLI.

In a possible implementation, the server sequentially performs the following determining on all data nodes except the first data node in the plurality of data nodes based on a sequence of the plurality of data nodes in the third preset condition, to determine the third data node.

For any data node other than the first data node of the plurality of data nodes, the server determines, by querying a running dataset, whether the any data node has been created; if the any data node is not created, the server queries a candidate dataset, and if a configuration for the any data node does not exist in the candidate dataset, the server determines the any data node as the third data node, and this determining ends; and if the configuration for the any one data node exists in the candidate dataset, the server determines a next data node of the any one data node of the plurality of data nodes, and the rest can be deduced by analogy.

It should be noted that if the server has determined all data nodes except the first data node in the plurality of data nodes, and finds that all data nodes except the first data node in the plurality of data nodes have been created, to avoid modifying a created data node, the server determines, based on the reason, that the configuration information includes configuring the parameter value of the first data node to satisfy the third preset condition. For example, if the third preset condition includes that the parameter value of the first data node is a third configuration parameter value, the configuration information includes configuring the parameter value of the first data node as the third configuration parameter value. That a data node has been created means that a configuration for the data node is stored in a running dataset.

Based on the example in the foregoing obtaining manner 5, if the reason includes that a parameter value of at least one of the data node write, the data node execute, and the data node debug does not satisfy the third preset condition, and a configuration for the data node write exists in the current running dataset, it indicates that the data node write is a data node having been created in the plurality of data nodes, and the server queries whether a configuration for the data node execute exists in the running dataset and the candidate dataset. In this case, neither the running dataset nor the candidate dataset has the configuration for the data node execute, indicating that the data node execute is a data node that has not been created in the plurality of data nodes. To satisfy the third preset condition, the server configures the parameter value of the data node execute as any data (for example, enable) other than disable, and the server determines that the configuration information includes creating the data node execute and configuring the parameter value of the data node execute as enable, so that the data node execute satisfies the third preset condition, and the server generates, based on the configuration information, a recommend packet shown in the following pseudocode 17.

Pseudocode 17:
    <recommended xmlns="urn:ietf:params:xml:ns:netconf:base:1.0">
    <aaa xmlns="urn:xx:yang:xx-aaa">
    <task-group-task-maps>
    <task-group-task-map>
    <task-group-name>1</task-group-name>
    <task-name>2</task-name>
    <execute>enable</execute>#The parameter value of the data node execute is configured as enable
    </task-group-task-map>
    </task-group-task-maps>
    </aaa>
    </recommended>

It should be noted that both the fourth type of configuration information and the fifth type of configuration information are configurations for resolving of an error of dissatisfying a conditional relationship. In a possible implementation, for error types of an error of dissatisfying a conditional relationship (for example, a when-type error and a must-type error), the server determines configuration information through a parallel processing procedure.

Figure 6:
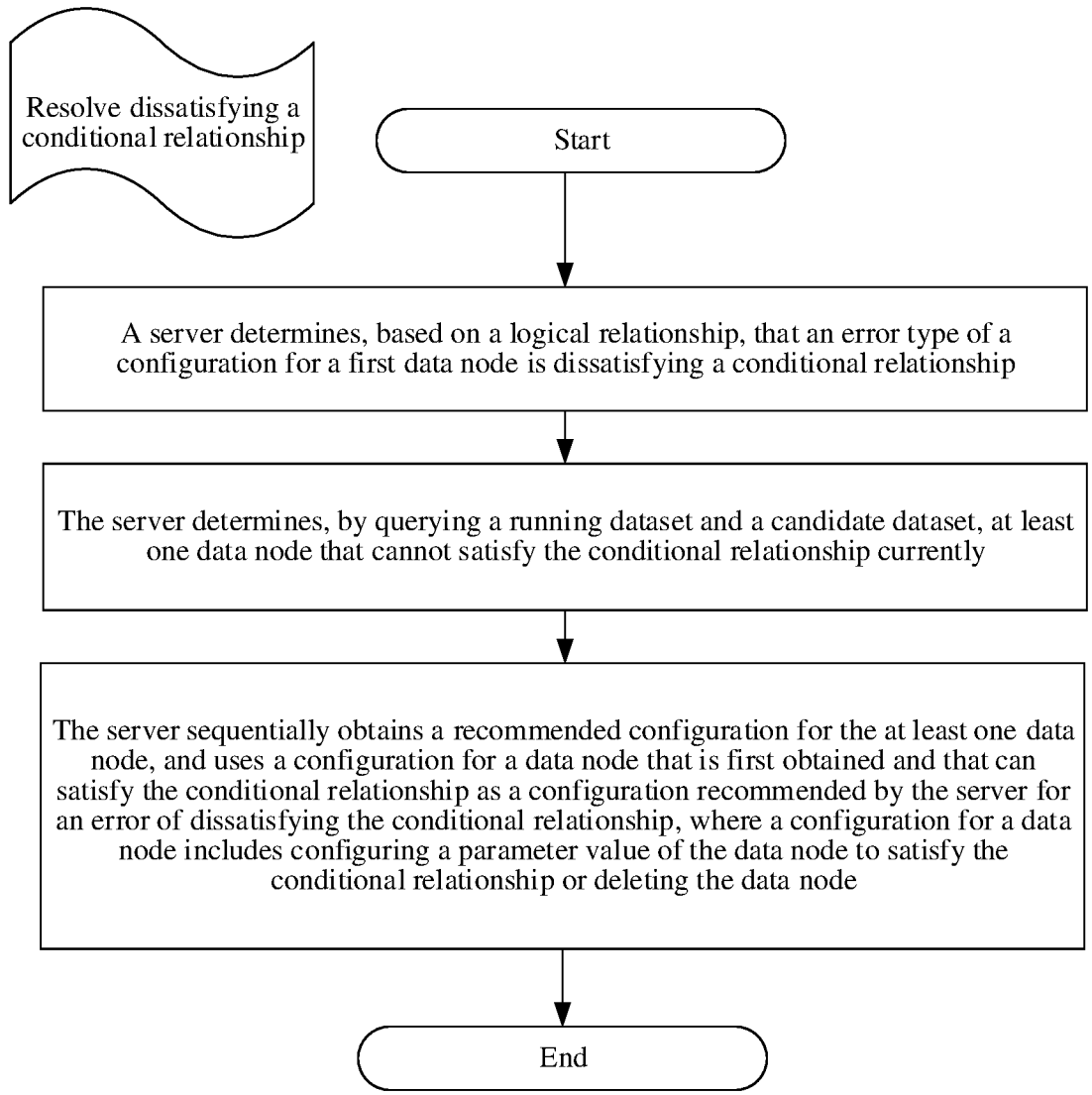
FIG. 6 shows a process of determining configuration information based on an error of dissatisfying a conditional relationship according to an embodiment of this application.

For example, a process of determining configuration information based on an error of dissatisfying a conditional relationship according to an embodiment of this application is shown in FIG. 6. The server determines, based on the logical relationship, that the error type of the configuration for the first data node is an error of dissatisfying a conditional relationship. For example, the preset condition defined in the when function or the must function in the logical relationship cannot be satisfied, or the conditional relationship includes the second preset condition or the third preset condition. Then, the server determines, by querying the running dataset and the candidate dataset, at least one data node that cannot satisfy the conditional relationship currently, and the server sequentially obtains a recommended configuration for the at least one data node, and uses a configuration for a data node that is first obtained and that can satisfy the conditional relationship as a configuration recommended by the server for an error of dissatisfying the conditional relationship, where a configuration for a data node includes configuring a parameter value of the data node to satisfy the conditional relationship or deleting the data node. That the data node is a data node 1 is used as an example. If all data nodes except the data node 1 in the conditional relationship are created, but the data node 1 is not created, to avoid modifying the created data node, the configuration for the data node 1 includes creating the data node 1 that satisfies the conditional relationship (that is, configuring the parameter value of the data node 1 to satisfy the conditional relationship). For another example, the conditional relationship is that the parameter value of the data node 1 is true and the default parameter value of the data node 1 is true. When the configuration of configuring the parameter value of the data node 1 as false fails to pass the validation, to avoid an error caused by configuring the parameter value of the data node 1 as false, the configuration recommended by the server for the data node 1 includes deleting the data node 1. Therefore, after the two configurations of configuring the parameter value of the data node 1 as false and deleting the data node 1 are subsequently run, the parameter value of the data node 1 is deleted, and the server uses the default value of the data node 1, so that the conditional relationship is satisfied.

Sixth type of configuration information: If the reason includes that a parameter value of the second data node conflicts with a parameter value of the first data node, the configuration information includes configuring the parameter value of the first data node as any parameter value other than the first configuration parameter value.

In this case, the parameter value of the second data node is the first configuration parameter value, and the parameter value of the second data node has a unique attribute. Therefore, to avoid a conflict between the parameter value of the second data node and the parameter value of the first data node, the server determines, based on the reason, that the configuration information includes configuring the parameter value of the first data node as any parameter value other than the first configuration parameter value, converts the configuration information into a recommend packet, and sends the recommend packet to the CLI.

In a possible implementation, the server determines, based on a preset selection rule, any parameter value other than the first configuration parameter value, and generates the configuration information based on the selected any parameter value. For example, if the data type of the parameter value of the first data node is a value type or an enumeration type, the server obtains a plurality of pieces of data of the value type or enumeration type arranged in ascending order, and the plurality of pieces of data do not include the first configuration information; and the server determines any piece of data, minimum data, or maximum data of the plurality of pieces of data as the parameter value of the first data node. If the data type of the parameter value of the first data node is a character string type, the server determines the parameter value of the first data node based on any character string in byte sequences, where each of the byte sequences includes the first configuration parameter value.

Based on the example in the obtaining process 6, if the reason includes that a parameter value of the data node id conflicts with a parameter value of the child node name, and the parameter value of the data node id has a unique attribute, to avoid a subsequent error that the parameter value of the data node id conflicts with the parameter value of the child node name, the server determines, based on this reason, that the configuration information includes configuring the parameter value of the child node name as 1, so as to be distinguished from the parameter value 0 of the data node id. The server generates, based on the configuration information, a recommend packet shown in the following pseudocode 18.

Pseudocode 18:
<recommended xmlns="urn:ietf:params:xml:ns:netconf:base:1.0">
<acl xmlns="urn:xx:yang:xx-acl">
<groups>
<group>
<identity>12</identity>
<rule-interfaces>
<rule-interface>
<name>eth1</name>
<id>1</id>#The parameter value of the child node name is configured as 1
</rule-interface>
</rule-interfaces>
</group>
</groups>
</acl>
</recommended>

Seventh type of configuration information: If the reason why the first data node fails to pass the validation includes that the quantity of first data nodes does not fall within the target range, the configuration information includes deleting a second quantity of first data nodes or creating a third quantity of first data nodes in the second data node.

Because the logical relationship includes that the quantity of first data nodes in the second data node falls within the target range, to avoid a case that the quantity of first data nodes does not fall within the target range, the server determines, based on the reason, that the configuration information includes deleting a second quantity of first data nodes or creating a third quantity of first data nodes in the second data node.

Alternatively, if the reason includes that the quantity of first data nodes is greater than the first target quantity, the configuration information includes deleting the second quantity of first data nodes, so that after the configuration for the first data node and the configuration included in the configuration information have been run, the quantity of first data nodes is less than or equal to the first target quantity.

Alternatively, if the reason includes that the quantity of first data nodes is less than the second target quantity, the configuration information includes creating a third quantity of first data nodes in the second data node, so that after the configuration for the first data node and the configuration included in the configuration information have been run, the quantity of first data nodes is greater than or equal to the second target quantity.

Based on the example in the obtaining process 7, if the reason includes that the quantity of data nodes tariff-levels is less than 8, to avoid a subsequent error that the quantity of data nodes tariff-levels is less than 8, the server determines, based on the reason if the configuration for the first data node includes creating one data node tariff-level in the container tariff-queue-mapping and the first data node still exists in the second data node in the running dataset in this case, that the configuration information includes creating seven data nodes tariff-level in the container tariff-queue-mapping, and parameter values of the seven data nodes tariff-level are respectively af1 to af4, ef, cs6, and cs7. The server generates, based on the configuration information, a recommend packet shown in the following pseudocode 19. Pseudocode 19:

<recommended xmlns="urn:ietf:params:xml:ns:netconf:base:1.0">
<bras-vas xmlns="urn:xx:yang:xx-bras-vas">
<tariff-queue-mapping>
<tariff-level>af1</tariff-level>
<tariff-level>af2</tariff-level>
<tariff-level>af3</tariff-level>
<tariff-level>af4</tariff-level>
<tariff-level>ef</tariff-level>
<tariff-level>cs6</tariff-level>
<tariff-level>cs7</tariff-level>
</tariff-queue-mapping>
</bras-vas>
</recommended>

In a possible implementation, if the first parameter in the first packet includes a first sub-parameter, and the first sub-parameter is for identifying a first mode of outputting configuration information to be enabled when the first preset condition is satisfied, that is, the server outputs a recommended configuration chain, so as to resolve a direct problem and an indirect problem that are caused by the configuration for the first data node. In this case, the configuration information includes the configuration chain.

In a possible implementation, before the server sends the configuration chain to the CLI, the server first determines the configuration chain. Alternatively, a process in which the server determines the configuration chain includes the following steps A and B.

Step A: When the first sub-parameter is for indicating to identify a second mode of outputting configuration information to be enabled when the first preset condition is satisfied, and if there are currently i configurations in the configuration chain, the server validates the configuration for the first data node and the i configurations in the configuration chain, where i is an integer greater than or equal to 1.

If i is equal to 1, the configuration in the configuration chain is the first configuration in the configuration chain. For a process of obtaining the first configuration in the configuration chain, refer to the foregoing description of the seven types of configuration information. The process of obtaining the first configuration in the configuration chain is not described in detail in this embodiment of this application.

For example, if i is equal to 1, the server validates the configuration for the first data node and the first configuration in the configuration chain, or if i is equal to 2, the server validates the configuration for the first data node, and the first configuration and the second configuration in the configuration chain.

In a possible implementation, for a $j^{th}$ configuration in the i configurations, when j=1, the $j^{th}$ configuration is for resolving a direct problem caused by the configuration for the first data node. Therefore, in a process in which the server validates the configuration for the first data node, due to existence of the $j^{th}$ configuration, the configuration for the first data node passes the validation of the server. When j is greater than 1 or less than or equal to i, the $j^{th}$ configuration is for resolving a direct problem caused by a $(j-1)^{th}$ configuration in the configuration chain. Therefore, in a process in which the server validates the $(j-1)^{th}$ configuration, due to existence of the $j^{th}$ configuration, the $(j-1)^{th}$ configuration passes the validation of the server. However, in this case, there is no recommendation for the $i^{th}$ configuration in the configuration chain. Therefore, when the server validates the $i^{th}$ configuration, the $i^{th}$ configuration may cause a new problem, and the $i^{th}$ configuration may fail to pass the validation.

It should be noted that a process in which the server validates the $j^{th}$ configuration is similar to a process in which the server validates the configuration for the first data node. The process in which the server validates the $j^{th}$ configuration is not described in detail in this embodiment of this application.

Step B: If the $i^{th}$ configuration fails to pass the validation, the server determines an $(i+1)^{th}$ configuration in the configuration chain based on a logical relationship between a fourth data node related to the $i^{th}$ configuration and a second data node in the data structure.

The fourth data node is a configuration object of the $i^{th}$ configuration. For example, the $i^{th}$ configuration includes creating a data node, and the data node is the fourth data node. The $(i+1)^{th}$ configuration is for resolving a direct problem caused by the $i^{th}$ configuration, that is, a configuration recommended when the $(i+1)^{th}$ configuration fails to pass the validation.

The process shown in step B is similar to the process in which the server determines the first configuration in the configuration chain based on the logical relationship between the first data node and the second data node. Step B is not described in detail in this embodiment of this application.

It should be noted that if the $i^{th}$ configuration passes the validation, the configuration chain has been obtained, or if the $i^{th}$ configuration fails to pass the validation, after the $(i+1)^{th}$ configuration is determined, jump to perform the foregoing step A for the configuration chain including the $(i+1)^{th}$ configuration, until the configuration for the first data node and each configuration in the configuration chain pass the validation.

In a possible implementation, when the first parameter in the first packet further includes a second sub-parameter, if the second sub-parameter is for indicating to identify a third mode of outputting configuration information to be enabled when the first preset condition is satisfied, the server sends the recommended configuration in the configuration information to the CLI. If the second sub-parameter is for indicating to identify a fourth mode of outputting configuration information to be enabled when the first preset condition is satisfied, the server sends the configuration for the first data node and the recommended configuration in the configuration information to the CLI together.

For example, the current running dataset is empty, and the configuration for the first data node is represented by the following configuration command:

touch/acl/groups/group[identity='12']/rule-interfaces/
rule-interface[name='eth0']/if-name eth0.

The configuration included in the configuration information is represented by the following configuration command:

touch/ifm/interfaces/interface[name='eth0']
touch/acl/groups/group[identity='12']/type interface.

If the value of the second sub-parameter only-supplement is true (that is, identifying the third mode of outputting configuration information to be enabled when the first preset condition is satisfied), the server returns to the CLI the configuration identified by the following configuration command:

touch/ifm/interfaces/interface[name='eth0']
touch/acl/groups/group[identity='12']/type interface.

If the value of the second sub-parameter only-supplement is false (that is, identifying the fourth mode of outputting configuration information to be enabled when the first preset condition is satisfied), the server returns to the CLI the configuration identified by the following configuration command:

touch/acl/groups/group[identity='12']/rule-interfaces/
 rule-interface[name='eth0']/if-name eth0
touch/ifm/interfaces/interface[name='eth0']
touch/acl/groups/group[identity='12']/type interface.

After determining a configuration to be returned to the CLI (such as the configuration included in the configuration information, or the configuration for the first data node and the configuration included in the configuration information), the server generates a recommend packet based on the determined configuration, and sends the recommend packet to the CLI, where the recommend packet includes the configuration determined by the server.

In a possible implementation, the process shown in step 406 is performed by the recommendation module in the server. Alternatively, after the recommendation module obtains the configuration for the first data node from the validation module in the server, the recommendation module performs this step 406. Alternatively, the validation module does not send the configuration for the first data node to the recommendation module, but sends a first result to the recommendation module; the recommendation module determines the first configuration in the configuration chain based on the first result; if the first sub-parameter is for indicating that the first mode is enabled, the recommendation module outputs the first configuration in the recommended configuration chain to the CLI; and if the first sub-parameter is for indicating that the second mode is enabled, the recommendation module returns the first configuration to the storage location indicated by the first information, and the validation module validates the configuration for the first data node and the first configuration again. If both the configuration for the first data node and the first configuration pass the validation, the recommendation module determines that the first configuration is a configuration chain, and if the first configuration fails to pass the validation, the validation module returns, to the recommendation module, a reason why the first configuration fails to pass the validation; and then, the recommendation module returns the second configuration on the configuration chain to the storage location based on the reason why the first configuration fails to pass the validation, and the rest can be deduced by analogy. After all configurations on the configuration chain pass validation of the validation module, the validation module sends the configuration chain as configuration information to the CLI.

407: The CLI obtains the configuration information, and displays the configuration information.

The CLI receives a recommend packet from the server, and the CLI converts, based on a preset configuration command format, a configuration included in configuration information in the recommend packet into a configuration command, and displays the configuration command obtained through the conversion. For any configuration included in the configuration information, using the MD-CLI as an example, the preset configuration command editing format includes that if the configuration is create and merge operations, no additional keyword needs to be added, and the CLI uses a configuration command format of container name+space+leaf+space+value and generates a corresponding configuration command based on the any configuration, or the CLI uses a configuration command format of touch+space+path+space+value and generates a corresponding configuration command based on the any configuration.

For example, if the recommend packet received by the server is shown in the pseudocode 14, the CLI converts the configuration information indicated by the pseudocode 14 into the following configuration command:
 remove/acl/groups/group[identity='12']/rule-interfaces/
  rule-interface[name='eth0']/if-name.

If the recommend packet received by the server is shown in the pseudocode 15, the CLI converts the configuration information indicated by the pseudocode 15 into the following configuration command:
 touch/acl/groups/group[identity='12']/type interface.

If the recommend packet received by the server is shown in the pseudocode 16, the CLI converts the configuration information indicated by the pseudocode 16 into the following configuration command:
 touch/aaa/authorization-schemes/authorization-scheme
  [author-scheme-name="12"]/no-response-policy
  offline.

If the recommend packet received by the server is shown in the pseudocode 17, the CLI converts the configuration information indicated by the pseudocode 17 into the following configuration command:
 touch/xx-aaa:aaa/task-group-task-maps/task-group-task-
  map[task-group-name="1"][task-name="2"]/execute
  enable.

If the recommend packet received by the server is shown in the pseudocode 18, the CLI converts the configuration information indicated by the pseudocode 18 into the following configuration command:
 touch/acl/groups/group[identity='12']/rule-interfaces/
  rule-interface[name='eth1']/id 1.

If the recommend packet received by the server is shown in the pseudocode 19, the CLI converts the configuration information indicated by the pseudocode 19 into the following configuration command:
 touch/bras-vas/tariff-queue-mapping af1
 touch/bras-vas/tariff-queue-mapping af2
 touch/bras-vas/tariff-queue-mapping af3
 touch/bras-vas/tariff-queue-mapping af4
 touch/bras-vas/tariff-queue-mapping ef
 touch/bras-vas/tariff-queue-mapping cs6
 touch/bras-vas/tariff-queue-mapping cs7.

408: The CLI sends a configuration included in the configuration information to the server.

In a possible implementation, the user checks the configuration command displayed in the CLI, and modifies the displayed configuration command based on manual experience. After detecting that the user performs a confirmation operation on the modified configuration command, the CLI converts the modified configuration command into an edit packet and sends the edit packet to the server. Certainly, if the user finds through check that the displayed configuration command is correct, that is, the displayed configuration command does not need to be modified, the user may not modify the displayed configuration command.

After receiving the edit packet, the server stores the configuration included in the edit packet in the candidate dataset, and returns an edit success response to the CLI. After receiving the edit success response, the CLI displays an edit success message. After the editing is successful, the user triggers the CLI to send a commit packet to the server. After receiving the commit packet, the server validates each configuration in the candidate dataset. In this case, the candidate dataset includes a configuration for the first data node and a configuration recommended by the server when the configuration for the first data node fails to pass the validation. Because the configuration recommended by the server can resolve a problem that the configuration for the first data node fails to pass the validation, the configuration for the first data node passes the validation of the server. If the configuration recommended by the server fails to pass the validation, the server jumps to perform step 406 for the configuration that fails to pass the validation, so that the server continues to send the recommended configuration to the CLI. The server transfers each configuration in the candidate dataset to the running dataset if the configuration recommended by the server passes the validation. After the transfer is completed, the server sends a commit completion response to the CLI. After receiving the commit completion response, the CLI displays a commit completion message to notify the user of the commit completion.

It should be noted that different values of the first sub-parameter in the first packet may cause different quantities of interactions between the CLI and the server. If the first sub-parameter is for indicating that the first mode is enabled, the configuration recommended by the server to the CLI is the first configuration in the configuration chain. After the server sends the first configuration in the configuration chain to the CLI, when the server validates the first configuration, the validation may fail. Then, the server continues to return the second configuration in the configuration chain to the CLI until all configurations committed by the CLI pass validation of the server. In this case, a small amount of data is transmitted between the CLI and the server each time, reducing the network load between the CLI and the server. If the first sub-parameter is for indicating that the second mode is enabled, after the CLI sends the configuration chain recommended by the server to the server, because the server has made the configuration chain pass validation before sending the configuration chain to the CLI, even when the server validates the configuration chain, the server allows the configuration chain to pass the validation. In this case, the quantity of interactions between the CLI and the server is small, and repeated participation of the user is not required.

For example, if the current running dataset is empty, the user performs the following editing on the display interface of the CLI and then sends the following configuration command to the server:
  touch/acl/groups/group[identity='12']/rule-interfaces/
    rule-interface[name='eth0']/if-name eth0.

After the server stores the configuration corresponding to the configuration command in the candidate dataset, if the user subsequently gives the commit command to the CLI, the CLI sends the commit packet to the server. After the server receives the commit packet, the server validates the configuration corresponding to the configuration command in the candidate dataset. If the validation fails and the value of the first sub-parameter need-recursion in the commit packet is false, the server enables the first mode based on the identifier of the first sub-parameter need-recursion, and returns a recommended first configuration to the CLI. The first configuration is represented by the following configuration command:
  touch/ifm/interfaces/interface[name='eth0'].

After the CLI subsequently stores the first configuration into the candidate dataset in the server, if the CLI sends the commit packet to the server again, and in the commit process, the first configuration fails to pass the validation, the server continues to return a recommended second configuration to the CLI. The second configuration is represented by the following configuration command:
  touch/acl/groups/group[identity='12']/type interface.

After the CLI subsequently stores the second configuration into the candidate dataset in the server, if the CLI sends the commit packet to the server again, and in the commit process, if the second configuration passes the validation, the server directly transfers each of the configuration corresponding to the configuration command, the first configuration, and the second configuration in the candidate dataset to the running dataset.

However, if the value of need-recursion is true, when the configuration corresponding to the configuration command fails to pass the validation, the server forms the first configuration and the second operation into one configuration chain described below, and returns the configuration chain to the CLI, so as to prevent the CLI from committing the configuration to the server for a plurality of times.

Configuration Chain:
  touch/ifm/interfaces/interface[name='eth0']
  touch/acl/groups/group[identity='12']/type interface.

It should be noted that if the first packet is a validate packet, and if the server allows both the configuration for the first data node and the recommended configuration to pass the validation after the CLI returns the recommended configuration to the server, the server returns a validation success response to the CLI. After receiving the validation success response, the CLI displays a validation success message without committing the configuration for the first data node and the recommended configuration to the running dataset.

In the method provided in this embodiment of this application, after receiving the packet including the first information, the server validates the configuration for the data node in the storage location identified by the first information. When the configuration for the data node fails to pass the validation, if the packet includes the first parameter, the server enables, based on the first parameter, the mode of outputting configuration information, and outputs recommended configuration information. A user does not need to construct a new configuration command, to resolve a problem that the configuration for the data node fails to pass the validation, thereby reducing node configuration duration and improving node configuration efficiency.

For the embodiment shown in FIG. 4, if the first packet does not include the first parameter, when the configuration for the first data node fails to pass the validation, the server reports an error to the CLI. For example, the server sends a first result to the CLI, and the CLI displays the first result, so as to indicate that the configuration for the first data node fails to pass the validation, so that the user edits a new configuration command in the CLI again based on the first result, and the CLI sends the new configuration command to the server, so as to overcome a problem that the configuration for the first data node fails to pass the validation. If the first packet includes the first parameter, when the configuration for the first data node fails to pass the validation, the server enables, based on values of sub-parameters included in the first parameter, different modes of outputting configuration information, and returns a recommended configuration to the CLI. To further describe the process, refer to FIG. 7 that is a flowchart of a method for configuring a node according to an embodiment of this application.

Figure 7:
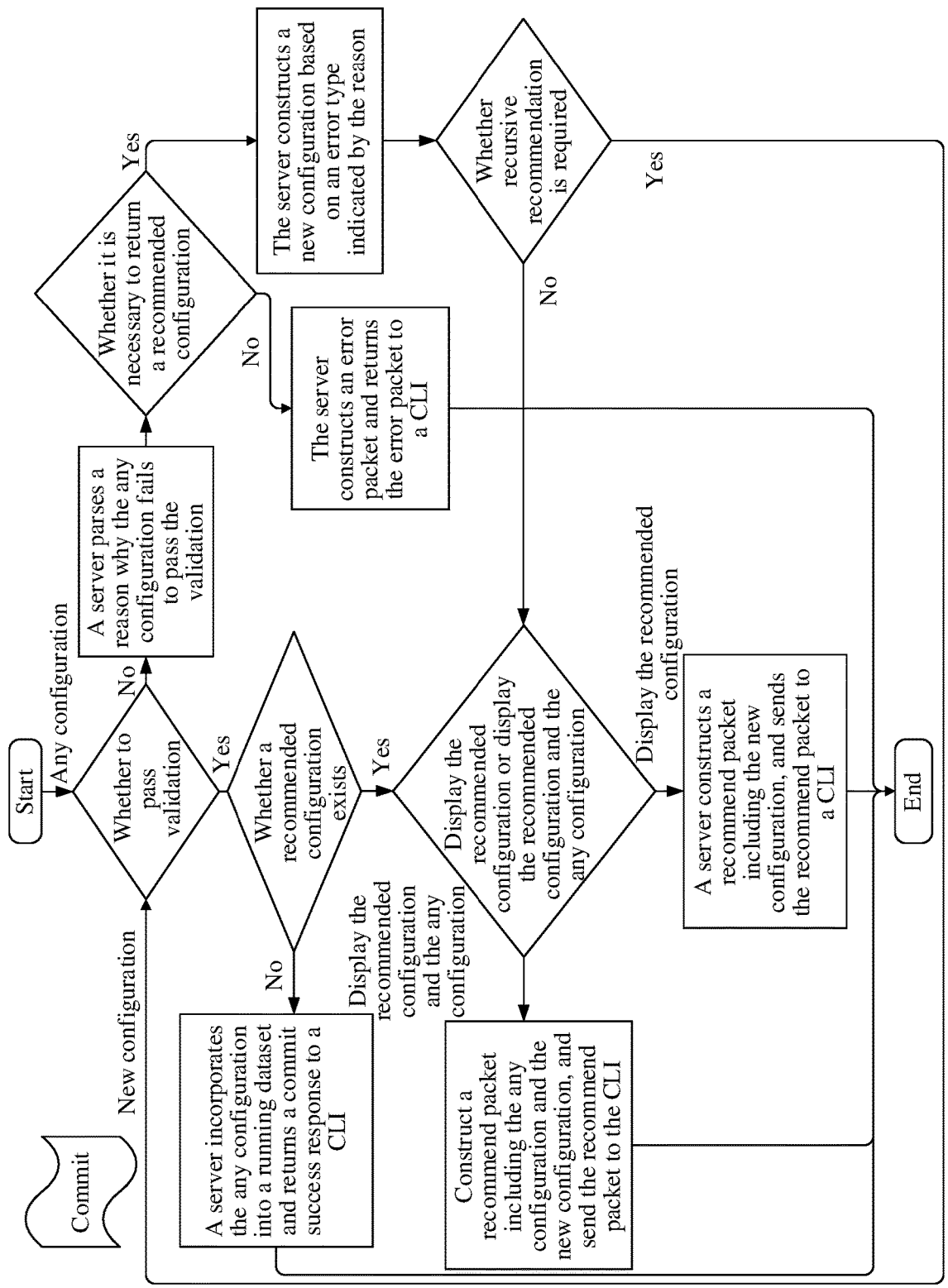
FIG. 7 is a flowchart of a method for configuring a node according to an embodiment of this application.

In the process shown in FIG. 7, that the first packet is a commit packet is used as an example. After the server receives the commit packet, the server validates any configuration in the candidate dataset. If the validation succeeds, the server determines whether a recommended configuration exists for the any configuration. If the recommended configuration does not exist, the server incorporates the any configuration into the running dataset and returns a commit success response to the CLI. If the any configuration fails to pass the validation, the server parses the reason why the any configuration fails to pass the validation, and determines whether it is necessary to return the recommended configuration (it is necessary to return the recommended configuration if the first packet includes the first parameter; otherwise, it is unnecessary to return the recommended configuration). If it is unnecessary to return the recommended configuration, the server constructs an error packet and returns the error packet to the CLI. If it is necessary to return the recommended configuration, the server constructs a new configuration (that is, the recommended configuration) based on error types (for example, conditional relationship errors in "when" and "must" types, reference errors in "leafref" and "instance-identifier" types, an error in a "mandatory" type, a conflict error in a "unique" type, and errors in "max-elements" and "min-elements" types) indicated by the reason. Then, the server determines whether recursive recommendation is required (if the first sub-parameter is for indicating that the first mode is enabled, recursive recommendation is not required; or if the first sub-parameter is for indicating that the second mode is enabled, recursive recommendation is required). If recursive recommendation is not required, the server continues to determine whether to display the recommended configuration or display the recommended configuration and the any configuration (if the second sub-parameter is for indicating that the third mode is enabled, the recommended configuration is displayed; or if the second sub-parameter is for indicating that the fourth mode is enabled, the recommended configuration and the any configuration are displayed). If the recommended configuration is displayed, the server constructs a recommend packet including the new configuration, and sends the recommend packet to the CLI. If the recommended configuration and the any configuration are displayed, the server constructs a recommend packet including the any configuration and the new configuration, and sends the recommend packet to the CLI. If recursive recommendation is required, the server validates the new configuration, and if the new configuration fails to pass the validation, the server performs, for the new configuration, a process performed when the any configuration fails to pass the validation. If the new configuration passes the validation, the server determines whether a recommended configuration exists for the any configuration. In this case, the recommended configuration obviously exists, and the server performs a determination on display.

Figure 8:
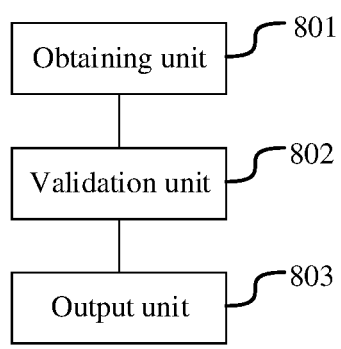
FIG. 8 is a schematic diagram of a structure of an apparatus for configuring a node according to an embodiment of this application.

FIG. 8 is a schematic diagram of a structure of an apparatus for configuring a node according to an embodiment of this application. The apparatus 800 includes:

an obtaining unit 801, configured to obtain a first packet, where the first packet includes first information and a first parameter, the first information is for identifying a storage location of a configuration for a first data node, and the first parameter is for identifying a mode of outputting configuration information to be enabled when a first preset condition is satisfied;

a validation unit 802, configured to validate the configuration for the first data node based on the first information; and an output unit 803, configured to output, based on the first parameter, the configuration information when a validation result satisfies the first preset condition.

In a possible implementation, the output unit 803 includes:

an obtaining subunit, configured to obtain a first result based on a logical relationship between the first data node and a second data node included in a data structure to which the first data node belongs, where the first result includes a reason why the configuration fails to pass the validation; and an output subunit, configured to output the configuration information based on the first result.

In a possible implementation, the configuration for the first data node includes deleting the first data node, and the logical relationship includes that the second data node references the first data node; and the obtaining subunit is configured to: if the second data node is created, obtain, based on the logical relationship, a reason why the configuration fails to pass the validation, where the reason why the configuration fails to pass the validation includes that the second data node lacks the first data node to be referenced.

In a possible implementation, the configuration information includes deleting the second data node.

In a possible implementation, the configuration for the first data node includes creating the first data node, and the logical relationship includes that the first data node references the second data node; and the obtaining subunit is configured to: if the second data node is not created, obtain, based on the logical relationship, a reason why the configuration fails to pass the validation, where the reason why the configuration fails to pass the validation includes that the first data node lacks the second data node to be referenced.

In a possible implementation, the configuration information includes creating the second data node.

In a possible implementation, the configuration for the first data node includes creating the first data node, and the logical relationship includes that the first data node and the second data node co-exist; and the obtaining subunit is configured to: if the second data node is not created, obtain, based on the logical relationship, a reason why the configuration fails to pass the validation, where the reason why the configuration fails to pass the validation includes that the second data node is missing.

In a possible implementation, the configuration information includes creating the second data node.

In a possible implementation, the configuration for the first data node includes configuring a parameter value of the first data node as a first configuration parameter value, and the logical relationship includes that the second data node is valid when the parameter value of the first data node satisfies a second preset condition; and the obtaining subunit is configured to: if the first configuration parameter value does not satisfy the second preset condition, obtain, based on the logical relationship, a reason why the configuration fails to pass the validation, where the reason why the configuration fails to pass the validation includes that the parameter value of the first data node does not satisfy the second preset condition.

In a possible implementation, the configuration information includes: configuring the parameter value of the first data node to satisfy the second preset condition.

In a possible implementation, the configuration for the first data node includes configuring a parameter value of the first data node as a first configuration parameter value, and the logical relationship includes that the second data node is valid when a parameter value of at least one data node of a plurality of data nodes included in the data structure satisfies a third preset condition, where the plurality of data nodes include the first data node; and the obtaining subunit is configured to: when no data node that satisfies the third preset condition exists in the plurality of data nodes, if the first configuration parameter value does not satisfy the third preset condition, obtain, based on the logical relationship, a reason why the configuration fails to pass the validation, where the reason why the configuration fails to pass the validation includes that a parameter value of at least one data node in the plurality of data nodes does not satisfy the third preset condition.

In a possible implementation, the configuration information includes:

creating a third data node of the plurality of data nodes that is not created, and configuring a parameter value of the third data node to satisfy the third preset condition; or configuring the parameter value of the first data node to satisfy the third preset condition.

In a possible implementation, the configuration for the first data node includes configuring a parameter value of the first data node as a first configuration parameter value, and the logical relationship includes that a parameter value of the second data node has a unique attribute; and the obtaining subunit is configured to: if the parameter value of the second data node is the first configuration parameter value, obtain, based on the logical relationship, a reason why the configuration fails to pass the validation, where the reason why the configuration fails to pass the validation is that the parameter value of the second data node conflicts with the parameter value of the first data node.

In a possible implementation, the configuration information includes configuring the parameter value of the first data node as any parameter value other than the first configuration parameter value.

In a possible implementation, the configuration for the first data node includes creating a first quantity of first data nodes in the second data node, and the logical relationship includes that the quantity of the first data nodes in the second data node falls within a target range; and the obtaining subunit is configured to: if the first quantity does not fall within the target range, obtain, based on the logical relationship, a reason why the configuration fails to pass the validation, where the reason why the configuration fails to pass the validation includes that the quantity of the first data nodes does not fall within the target range.

In a possible implementation, the configuration information includes:

deleting a second quantity of first data nodes; or creating a third quantity of first data nodes in the second data node.

In a possible implementation, the first parameter includes a first sub-parameter, and the first sub-parameter is for identifying a first mode or a second mode of outputting configuration information to be enabled when the first preset condition is satisfied, where the first mode is that the output configuration information includes a first configuration in a configuration chain, the second mode is that the output configuration information includes the configuration chain, the configuration chain includes a configuration for at least one data node, and one data node corresponds to at least one configuration.

In a possible implementation, the first parameter includes a second sub-parameter, and the second sub-parameter is for identifying a third mode or a fourth mode of outputting configuration information to be enabled when the first preset condition is satisfied, where the third mode is outputting the configuration information, and the fourth mode is outputting the configuration information and the configuration for the first data node.

In a possible implementation, the first packet is a commit packet or a validate packet.

Figure 9:
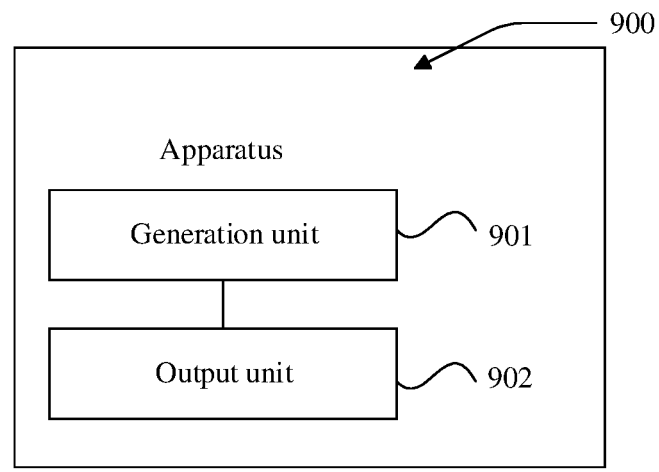
FIG. 9 is a schematic diagram of a structure of an apparatus for configuring a node according to an embodiment of this application.

FIG. 9 is a schematic diagram of a structure of an apparatus for configuring a node according to an embodiment of this application. The apparatus 900 includes:

a generation unit 901, configured to generate a first packet, where the first packet includes first information and a first parameter, the first information is for identifying a storage location of a configuration for a first data node, and the first parameter is for identifying a mode of outputting configuration information to be enabled when a first preset condition is satisfied; and an output unit 902, configured to output the first packet to a server.

In a possible implementation, the first parameter includes a first sub-parameter, and the first sub-parameter is for identifying a first mode or a second mode of outputting configuration information to be enabled when the first preset condition is satisfied, where the first mode is that the output configuration information includes a first configuration in a configuration chain, the second mode is that the output configuration information includes the configuration chain, the configuration chain includes a configuration for at least one data node, and one data node corresponds to at least one configuration.

In a possible implementation, the first parameter includes a second sub-parameter, and the second sub-parameter is for identifying a third mode or a fourth mode of outputting configuration information to be enabled when the first preset condition is satisfied, where the third mode is outputting the configuration information, and the fourth mode is outputting the configuration information and the configuration for the first data node.

In a possible implementation, the first packet is a commit packet or a validate packet.

In a possible implementation, the apparatus 900 further includes:

a receiving unit, configured to receive the configuration information; and a display unit, configured to display a configuration included in the configuration information.

Any combination of all the foregoing optional technical solutions may be used to form optional embodiments of this disclosure, and details are not described herein again.

It should be noted that when the apparatus for configuring a node provided in the foregoing embodiments processes a configuration for a node, division of the foregoing functional modules is merely used as an example for description. In actual application, the foregoing functions may be allocated to different functional modules for implementation according to a requirement. That is, an internal structure of the apparatus is divided into different functional modules to implement all or some of the functions described above. In addition, the method embodiments for configuring a node provided in the foregoing embodiments belong to a same concept. For a specific implementation process of the method embodiments, refer to the method embodiments. Details are not described herein again.

An embodiment of this application further provides a computer program product or a computer program. The computer program product or the computer program includes a computer instruction, the computer instruction is stored in a computer-readable storage medium, and a processor of a computer device reads the computer instruction from the computer-readable storage medium. The processor executes the computer instruction, to enable the computer device to perform the foregoing method for configuring a node.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method, applied to a server, the method comprising:
obtaining a first packet, wherein the first packet comprises first information and a first parameter, the first information identifies a storage location of a configuration for a first data node, and the first parameter identifies a mode of outputting configuration information to be enabled when a first preset condition is satisfied;
attempting to validate the configuration for the first data node based on the first information, to obtain a validation result; and
outputting, based on the first parameter, the configuration information when the validation result satisfies the first preset condition, comprising:
in response to the configuration for the first data node failing to pass validation, parsing a reason why the configuration fails to pass validation, and outputting configuration information comprising recommended configuration information, wherein the recommended configuration information is constructed based on error types indicated by the reason why the configuration fails to pass validation.

2. The method according to claim 1, wherein parsing the reason why the configuration fails to pass validation, and outputting the configuration information comprising the recommended configuration information comprises:
obtaining a first result based on a logical relationship between the first data node and a second data node comprised in a data structure to which the first data node belongs, wherein the first result comprises the reason why the configuration fails to pass the validation; and
outputting the configuration information based on the first result.

3. The method according to claim 2, wherein the configuration for the first data node comprises an instruction to delete the first data node, and the logical relationship comprises that the second data node references the first data node; and
wherein obtaining the first result based on the logical relationship between the first data node and the second data node comprised in the data structure to which the first data node belongs comprises:
when the second data node is created, obtaining, based on the logical relationship, the reason why the configuration fails to pass the validation, wherein the reason why the configuration fails to pass the validation comprises that the second data node lacks the first data node to be referenced.

4. The method according to claim 3, wherein the recommended configuration information comprises an instruction to delete the second data node.

5. The method according to claim 2, wherein the configuration for the first data node comprises an instruction to create the first data node, and the logical relationship comprises that the first data node references the second data node; and
wherein obtaining the first result based on the logical relationship between the first data node and the second data node comprised in the data structure to which the first data node belongs comprises:
when the second data node is not created, obtaining, based on the logical relationship, the reason why the configuration fails to pass the validation, wherein the reason why the configuration fails to pass the validation comprises that the first data node lacks the second data node to be referenced.

6. The method according to claim 5, wherein the recommended configuration information comprises an instruction to create the second data node.

7. The method according to claim 2, wherein the configuration for the first data node comprises an instruction to create the first data node, and the logical relationship comprises that the first data node and the second data node co-exist; and
wherein obtaining the first result based on the logical relationship between the first data node and the second data node comprised in the data structure to which the first data node belongs comprises:
when the second data node is not created, obtaining, based on the logical relationship, the reason why the configuration fails to pass the validation, wherein the reason why the configuration fails to pass the validation comprises that the second data node is missing.

8. The method according to claim 7, wherein the recommended configuration information comprises an instruction to create the second data node.

9. The method according to claim 2, wherein the configuration for the first data node comprises an instruction to configure a parameter value of the first data node as a first configuration parameter value, and the logical relationship comprises that the second data node is valid when the parameter value of the first data node satisfies a second preset condition; and
wherein obtaining the first result based on the logical relationship between the first data node and the second data node comprised in the data structure to which the first data node belongs comprises:
when the first configuration parameter value does not satisfy the second preset condition, obtaining, based on the logical relationship, the reason why the configuration fails to pass the validation, wherein the reason why the configuration fails to pass the validation comprises that the parameter value of the first data node does not satisfy the second preset condition.

10. The method according to claim 9, wherein the recommended configuration information comprises:
an instruction to configure the parameter value of the first data node to satisfy the second preset condition.

11. An apparatus, comprising:
a memory storing instructions; and
at least one processor coupled to the memory and configured to execute the instructions, wherein the instructions comprise instructions to:
obtain a first packet, wherein the first packet comprises first information and a first parameter, the first information identifies a storage location of a configuration for a first data node, and the first parameter identifies a mode of outputting configuration information to be enabled when a first preset condition is satisfied;
attempt to validate the configuration for the first data node based on the first information, to obtain a validation result; and
output, based on the first parameter, the configuration information when the validation result satisfies the first preset condition, comprising:
in response to the configuration for the first data node failing to pass validation, parsing a reason why the configuration fails to pass validation, and outputting configuration information comprising recommended configuration information, wherein the recommended configuration information is constructed based on error types indicated by the reason why the configuration fails to pass validation.

12. The apparatus according to claim 11, wherein the instructions further comprise instructions to:
obtain a first result based on a logical relationship between the first data node and a second data node comprised in a data structure to which the first data node belongs, wherein the first result comprises a reason why the configuration fails to pass the validation; and
output the configuration information based on the first result.

13. The apparatus according to claim 12, wherein the configuration for the first data node comprises an instruction to delete the first data node, and the logical relationship comprises that the second data node references the first data node; and the instructions further include instructions to:
when the second data node is created, obtain, based on the logical relationship, the reason why the configuration fails to pass the validation, wherein the reason why the configuration fails to pass the validation comprises that the second data node lacks the first data node to be referenced.

14. The apparatus according to claim 13, wherein the recommended configuration information comprises an instruction to delete the second data node.

15. The apparatus according to claim 12, wherein the configuration for the first data node comprises creating the first data node, and the logical relationship comprises that the first data node references the second data node; and the instructions further include instructions to:
when the second data node is not created, obtain, based on the logical relationship, the reason why the configuration fails to pass the validation, wherein the reason why the configuration fails to pass the validation comprises that the first data node lacks the second data node to be referenced.

16. The apparatus according to claim 15, wherein the recommended configuration information comprises an instruction to create the second data node.

17. The apparatus according to claim 12, wherein the configuration for the first data node comprises creating the first data node, and the logical relationship comprises that the first data node and the second data node co-exist; and the instructions further include instructions to:
when the second data node is not created, obtain, based on the logical relationship, the reason why the configuration fails to pass the validation, wherein the reason why the configuration fails to pass the validation comprises that the second data node is missing.

18. The apparatus according to claim 17, wherein the recommended configuration information comprises an instruction to create the second data node.

19. The apparatus according to claim 12, wherein the configuration for the first data node comprises an instruction to configure a parameter value of the first data node as a first configuration parameter value, and the logical relationship comprises that the second data node is valid when the parameter value of the first data node satisfies a second preset condition; and the instructions further include instructions to:
when the first configuration parameter value does not satisfy the second preset condition, obtain, based on the logical relationship, the reason why the configuration fails to pass the validation, wherein the reason why the configuration fails to pass the validation comprises that the parameter value of the first data node does not satisfy the second preset condition.

20. The apparatus according to claim 19, wherein the recommended configuration information comprises:
an instruction to configure the parameter value of the first data node to satisfy the second preset condition.

* * * * *